United States Patent
Oh et al.

(10) Patent No.: US 12,132,537 B2
(45) Date of Patent: Oct. 29, 2024

(54) METHOD AND APPARATUS FOR CORRECTING MULTI-INPUT MULTI-OUTPUT BEAMFORMING PATTERN IN WIRELESS COMMUNICATION SYSTEM

(71) Applicant: SAMSUNG ELECTRONICS CO., LTD., Suwon-si (KR)

(72) Inventors: Changyeong Oh, Suwon-si (KR); Jeehye Cha, Suwon-si (KR); Sooyoung Hur, Suwon-si (KR); Yongseok Park, Suwon-si (KR); Jinho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 17/756,551

(22) PCT Filed: Nov. 18, 2020

(86) PCT No.: PCT/KR2020/016294
§ 371 (c)(1),
(2) Date: May 26, 2022

(87) PCT Pub. No.: WO2021/107491
PCT Pub. Date: Jun. 3, 2021

(65) Prior Publication Data
US 2022/0416855 A1    Dec. 29, 2022

(30) Foreign Application Priority Data
Nov. 29, 2019    (KR) .................. 10-2019-0157459

(51) Int. Cl.
*H04L 1/02* (2006.01)
*H04B 7/0456* (2017.01)
(Continued)

(52) U.S. Cl.
CPC .......... *H04B 7/0456* (2013.01); *H04W 16/28* (2013.01); *H04W 24/02* (2013.01)

(58) Field of Classification Search
CPC .... H04B 7/0617; H04B 17/12; H04B 7/0414; H04W 16/28; H04W 24/02; H04L 1/0009
(Continued)

(56) References Cited

U.S. PATENT DOCUMENTS 8,169,376 B2    5/2012    Eom et al.
10,015,703 B2    7/2018    Futaki et al.
(Continued)

FOREIGN PATENT DOCUMENTS

EP    3966959 A1    3/2022
JP    6249172 B2    12/2017
(Continued)

OTHER PUBLICATIONS

Supplementary European Search Report dated Dec. 5, 2022 in connection with European Patent Application No. 20 89 3147, 9 pages.
(Continued)

*Primary Examiner* — Khai Tran

(57) ABSTRACT

According to a method of an embodiment of the present disclosure, a method for correcting a beamforming pattern of a base station by an analysis server of a base station management network may comprise the steps of: when network management information is received from a first base station, identifying whether or not the network management information indicates the occurrence of a failure in an antenna element of the first base station; when the network management information indicates the occurrence of the failure in the antenna element of the first base station, analyzing an effect of a beamforming pattern of the first base station and analyzing a change in a cell coverage; on the
(Continued)

basis of the result of the analysis, determining a first beamforming pattern for compensating for the failure in the antenna element; and transmitting, to the first base station, information about the first beamforming pattern by including the information in management control information.

14 Claims, 21 Drawing Sheets

(51) Int. Cl.
*H04W 16/28* (2009.01)
*H04W 24/02* (2009.01)

(58) Field of Classification Search
USPC .......................................... 375/267, 260, 262
See application file for complete search history.

(56) References Cited

U.S. PATENT DOCUMENTS

| | | | |
|---|---|---|---|
| 11,343,681 B1* | 5/2022 | Kim | ................. H04W 16/28 |
| 2006/0019710 A1 | 1/2006 | Ylitalo | |
| 2013/0257654 A1 | 10/2013 | Hu et al. | |
| 2013/0331136 A1* | 12/2013 | Yang | ................. H04B 7/0619 |
| | | | 455/501 |
| 2014/0329485 A1* | 11/2014 | Calin | ................. H04L 63/1475 |
| | | | 455/296 |
| 2017/0295260 A1* | 10/2017 | Pierce | ................. G06F 16/24547 |
| 2018/0145408 A1 | 5/2018 | Bull et al. | |
| 2018/0227899 A1 | 8/2018 | Yu et al. | |
| 2018/0351605 A1 | 12/2018 | Liang et al. | |
| 2019/0149545 A1* | 5/2019 | Arora | ................. H04W 12/06 |
| | | | 726/7 |
| 2020/0028772 A1* | 1/2020 | Laslau | ................. H04L 43/0817 |
| 2020/0252143 A1 | 8/2020 | Liu et al. | |
| 2020/0382195 A1 | 12/2020 | Hur et al. | |

FOREIGN PATENT DOCUMENTS

| | | |
|---|---|---|
| KR | 20120081297 A | 7/2012 |
| KR | 20200137278 A | 12/2020 |
| WO | 2019092476 A1 | 5/2019 |

OTHER PUBLICATIONS

International Search Report and Written Opinion of the International Searching Authority in connection with International Application No. PCT/KR2020/016294 issued Feb. 21, 2022, 9 pages.

Moysen et al., "From 4G to 5G: Self-organized network management meets machine learning," Computer Communications, vol. 129, Sep. 2018, 21 pages.

Communication pursuant to Article 94(3) EPC dated Mar. 28, 2024, in connection with European Patent Application No. 20893147.7, 6 pages.

Office Action dated Apr. 21, 2024, in connection with Korean Patent Application No. 10-2019-0157459, 10 pages.

* cited by examiner

FIG. 12G

| Coverage Map \| Antenna Beam Pattern \| Recovery Beam \| KPI Trend | Original | Path-fail (A) | Self-healing (B) | Diff. (A - B) | Result (A - B)/A (%) |
|---|---|---|---|---|---|
| OVERALL_BEAM_FOCUS | | | | | |
| Similarity with original beam | 0 | 0.4044 | 0.3874 | 0.0571 | 14.1088 |
| Peak antenna gain(dB) | 16.5706 | 15.1222 | 16.2011 | -1.0789 | -7.1344 |
| OVERALL_BEAM_QUADRATIC_FOCUS | | | | | |
| Similarity with original beam | 0 | 3.4471 | 2.5784 | 0.8707 | 25.2385 |
| Peak antenna gain(dB) | 16.5706 | 15.1222 | 16.2011 | -1.0789 | -7.1344 |
| FRONT_LOBE_FOCUS | | | | | |
| Similarity with original beam | 0 | 0.3334 | 0.2784 | 0.055 | 17.3957 |
| Peak antenna gain(dB) | 16.5706 | 15.1222 | 16.2011 | -1.0789 | -7.1344 |
| FRONT_QUADRATIC_FOCUS | | | | | |
| Similarity with original beam | 0 | 3.1848 | 2.3021 | 0.8827 | 26.0637 |
| Peak antenna gain(dB) | 16.5706 | 15.1222 | 16.2011 | -1.0789 | -7.1344 |
| MAIN_BEAM_FOCUS | | | | | |
| Similarity with original beam | 0 | 0.0319 | 0.0193 | 0.0127 | 39.7214 |
| Peak antenna gain(dB) | 16.5706 | 15.1222 | 16.2011 | -1.0789 | -7.1344 |
| MAIN_BEAM_QUADRATIC_FOCUS | | | | | |
| Similarity with original beam | 0 | 0.2894 | 0.0884 | 0.201 | 67.1463 |
| Peak antenna gain(dB) | 16.5706 | 15.1222 | 16.2011 | -1.0789 | -7.1344 |
| DB_Scale_FUNCTION | | | | | |
| Similarity with original beam | 0 | 4.378 | 4.3897 | -0.0117 | -0.2679 |
| Peak antenna gain(dB) | 16.5706 | 15.1222 | 16.2011 | -1.0789 | -7.1344 |

Cell details
- Cell Info.
  - eNB ID
  - Cell ID
- Basic Info.
  - Type
  - Location
  - EMS
  - ...
- Current Info.
  - Self-Healing enabled
  - failed path #
  - path state list
- Self-healing history
  - total #

METHOD AND APPARATUS FOR CORRECTING MULTI-INPUT MULTI-OUTPUT BEAMFORMING PATTERN IN WIRELESS COMMUNICATION SYSTEM

CROSS-REFERENCE TO RELATED APPLICATIONS

This application is a 371 of International Application No. PCT/KR2020/016294 filed Nov. 18, 2020, which claims priority to Korean Patent Application No. 10-2019-0157459 filed Nov. 29, 2019, the disclosures of which are herein incorporated by reference in their entirety.

BACKGROUND

1. Field

The disclosure relates to a method and device for analyzing and correcting a pattern of a multi-input multi-output (MIMO) beam in a wireless communication system, and more particularly, to a method and a device for analyzing and correcting a pattern of a MIMO beam in a mobile communication system.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

When a MIMO scheme is provided with a higher speed as described above, a failure or error may occur in at least one of MIMO antenna elements in a base station. A failure or error of at least one of the MIMO antenna elements may occur for various reasons. In this case, the base station needs a method for receiving a method for compensating (or correcting) distortion of a beamforming pattern that occurs due to an antenna element failure either by itself or from an upper server to recover the distorted beamforming pattern.

Further, when the distortion of the beamforming pattern occurs due to the failure of the antenna element, it is necessary to notify an operator of this fact and to notify the operator about how to recover the distorted beamforming pattern.

SUMMARY

Accordingly, the disclosure provides a method and device for compensating (or correcting) distortion of a beamforming pattern due to a failure or error occurring in at least one element of antenna elements in a base station using a MIMO scheme.

Further, the disclosure provides a method and device for minimizing communication disruption when a failure or error occurs in at least one element of antenna elements in a base station using a MIMO scheme.

Further, the disclosure provides a method and device for notifying an operator of this when a failure or error occurs in at least one element of antenna elements in a base station using a MIMO scheme.

Further, the disclosure provides a method and device capable of notifying an operator of a compensation (or correction) technique being applied when a failure or error occurs in at least one of antenna elements in a base station using a MIMO scheme.

According to an embodiment of the disclosure, a method of correcting a beamforming pattern of a base station by an analysis server in a base station management network may include identifying, when network management information is received from a first base station, whether the network management information indicates antenna element failure occurrence of the first base station; analyzing, when the network management information indicates antenna element failure occurrence of the first base station, beamforming pattern impact analysis and cell coverage change of the first base station; determining a first beamforming pattern for compensating for the failure of the antenna element based on the analysis result; and transmitting, to the first base station, the management control information including information on the first beamforming pattern.

Further, the method may further include analyzing, when network management information from the first base station indicates a decrease in cell performance of the first base station, a user pattern of the first base station and an impact of an adjacent cell; determining a second beamforming pattern based on the analysis result; and including the second beamforming pattern in management control information and transmitting the management control information to the first base station.

According to an embodiment of the disclosure, an analysis server device for correcting a beamforming pattern of a base station in a base station management network includes an input/output unit configured to receive network management information from a first base station directly or through a node of the base station management network, and to transmit management control information to the first base station directly or through a node of the base station management network; a database configured to store base station management information and management control information on all base stations in the management network; and a controller,
wherein the controller may control to
identify whether the network management information indicates antenna element failure occurrence of the first base station when network management information is received from the first base station through the input/ output unit, to analyze beamforming pattern impact analysis and cell coverage change of the first base station when the network management information indicates antenna element failure occurrence of the first base station, to determine a first beamforming pattern for compensating for the failure of the antenna element based on the analysis result, and transmit, to the first base station through the input/output unit, the management control information including the first beamforming pattern.

Further, the controller may control to analyze a user pattern of the first base station and an impact of adjacent cells when the network management information from the first base station indicates cell performance degradation of the first base station, to determine a second beamforming pattern based on the analysis result, and to include the second beamforming pattern in management control information and transmit the management control information to the first base station through the input/output unit.

According to another embodiment of the disclosure, a method for an analysis server of a base station management network to correct a beamforming pattern of a base station may include analyzing time series and regional statistics using key performance indicators (KPIs) of a first base station received as network management information; predicting a congestion time section of the first base station; determining cell coverage in a congestion time section based on a preconfigured policy; determining a first beamforming pattern based on the determined cell coverage; and transmitting, to the first base station, management control information including information on the first beamforming pattern.

According to another embodiment of the disclosure, an analysis server device for correcting a beamforming pattern of a base station in a base station management network may include an input/output unit configured to receive network management information from a first base station directly or through a node of the base station management network and to transmit management control information to the first base station directly or through a node of the base station management network; a database configured to store base station management information and management control information for all base stations in the management network; and a controller, wherein the controller may be configured to control to analyze time series and regional statistics using key performance indicators (KPIs) of the first base station received as network management information, to predict a congestion time section of the first base station, to determine cell coverage in a congestion time section based on a preconfigured policy, to determine a first beamforming pattern based on the determined cell coverage, and to transmit, to the first base station through the input/output unit, the management control information including the first beamforming pattern.

By applying a device and method of the disclosure, when a failure or error occurs in at least one of antenna elements in a base station using a MIMO scheme, it is possible to adaptively compensate (or correct) the failure or error. Thereby, it is possible to minimize disruption to communication.

Further, by applying a device and method of the disclosure, when a failure or error occurs in at least one of antenna elements in a base station using a MIMO scheme, it is possible to notify an operator of this, and it is possible to notify the operator of a currently applied compensation (or correction) technique.

BRIEF DESCRIPTION OF THE DRAWINGS

FIGS. 12A to 12I are exemplary diagrams of a graphical interface for providing control results and current states of base stations to an operator according to various embodiments of the disclosure.

DETAILED DESCRIPTION

Figure 1:
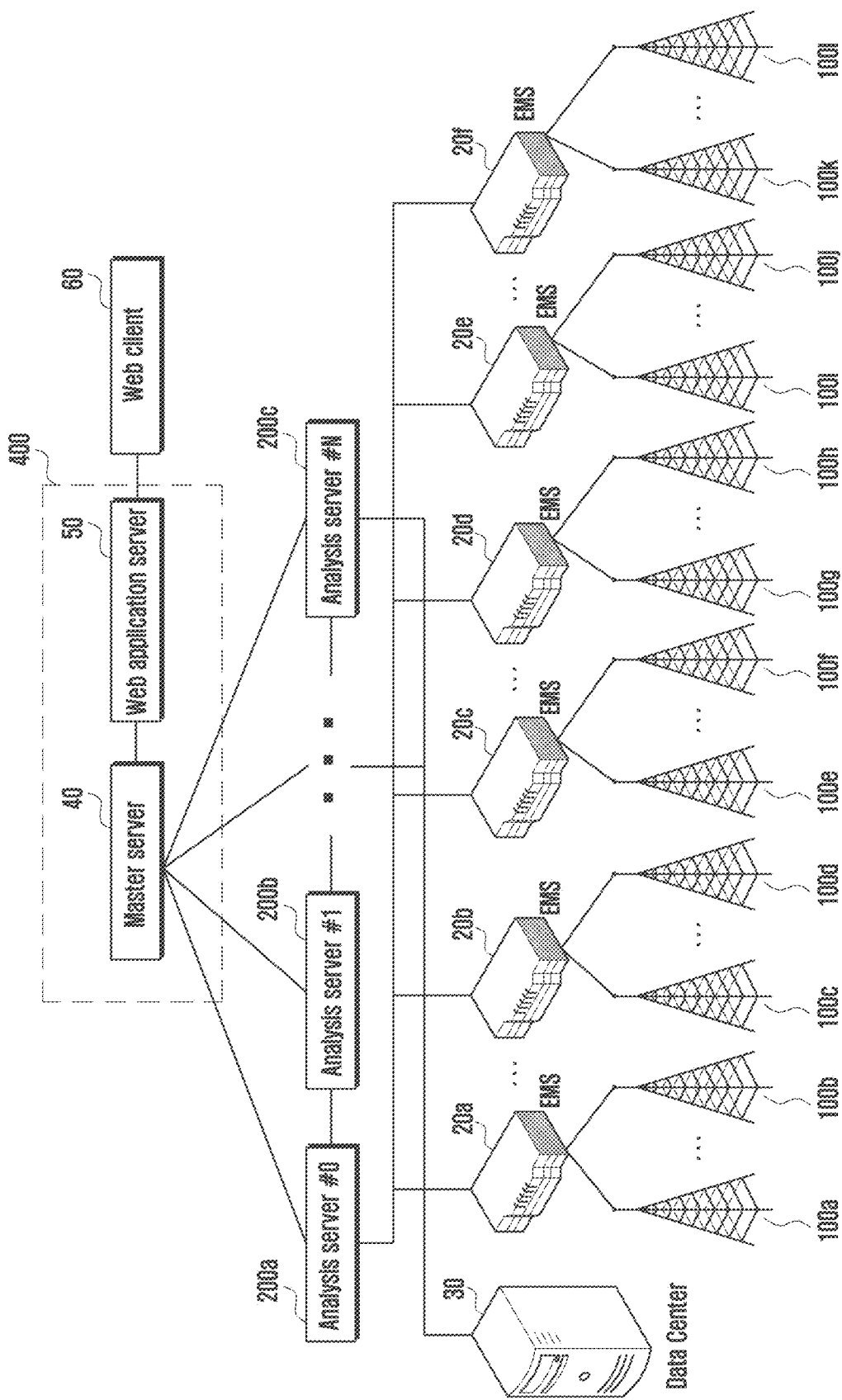
FIG. 1 is a diagram illustrating a management network for managing base stations of a mobile communication system according to an embodiment of the disclosure.

Hereinafter, various embodiments will be described in detail with reference to the accompanying drawings. In this case, it should be noted that in the accompanying drawings, the same components are denoted by the same reference numerals as much as possible. Further, it should be noted that the accompanying drawings are provided to help the understanding of the disclosure, and are not limited to the form or disposition illustrated in the drawings of the disclosure. Further, detailed descriptions of well-known functions and configurations that may obscure the subject matter will be omitted. In the following description, only parts necessary for understanding an operation according to various embodiments of the disclosure are described, and it should be noted that descriptions of other parts will be omitted so as not to obscure the gist of the disclosure.

With the advent of the 5G communication era, the introduction of massive MIMO technology is becoming common. For this reason, an installation ratio of active type antennas in commercial operator networks, for example, in each mobile communication operator network is increasing. The active type antenna is an antenna having a feature in which a dynamic change of a beamforming pattern is physically possible by changing an antenna parameter. The disclosure may provide a massive MIMO beamforming pattern optimization solution. According to the disclosure, a method and device for performing various beam pattern related events, for example, constant optimization and recovery of distortion due to breakdown occurrence will be described. Further, the disclosure provides a method and device for visually providing a changed beam pattern according to the above-described method to an operator, and enabling the operator to comprehensively analyze an impact of the beam pattern change through various analysis features.

Further, the disclosure provides a method and device for predicting a change in network performance caused by a change in a beam pattern, for example, a key performance indicator (KPI), coverage, and electric field strength by region.

Further, the disclosure provides a method and device for real-time status monitoring and action recommendation so that more immediate actions are possible and fundamental actions are possible so as to ensure a network service quality when a specific antenna element fails.

Further, the disclosure provides a method and device for optimizing beamforming appropriate for a situation through optimization policy automatic update and analysis through statistical analysis and machine learning and provides a method and device for continuous improvement of network performance reliability based on this.

FIG. 1 is a diagram illustrating a management network for managing base stations of a mobile communication system according to an embodiment of the disclosure.

With reference to FIG. 1, each of base stations 100a, 100b, 100c, 100d, 100e, 100f, 100g, 100h, 100i, 100j, 100k, and 100l may be one base station having each communication area. These base stations 100a, 100b, 100c, 100d, 100e, 100f, 100g, 100h, 100i, 100j, 100k, and 100l may be an eNB of an LTE system or a gNB of a 5G network. Further, these base stations 100a, 100b, 100c, 100d, 100e, 100f, 100g, 100h, 100i, 100j, 100k, and 100l may be various types of base stations using a MIMO scheme. Each of these base stations 100a, 100b, 100c, 100d, 100e, 100f, 100g, 100h, 100i, 100j, 100k, and 100l may communicate with a user equipment (UE) (not illustrated in FIG. 1) positioned inside a cell area thereof and be connected to a mobile communication network (not illustrated in FIG. 1) and a management network. The base stations 100a, 100b, 100c, 100d, 100e, 100f, 100g, 100h, 100i, 100j, 100k, and 100l according to the disclosure will be described in more detail in FIG. 2 to be described later.

In the form illustrated in FIG. 1, the base stations 100a, . . . , 100b are connected to an entity management system (EMS) 20a, and the base stations 100c, . . . , 100d are connected to an EMS 20b, the base stations 100e, . . . , 100f are connected to an EMS 20c, the base stations 100g, . . . , 100h are connected to an EMS 20d, the base stations 100i, . . . , 100j are connected to an EMS 20e, and the base stations 100k, . . . , 100l are connected to an EMS 20f. Each of the base stations 100a, . . . , 100l may generate failure or error information when a failure or error (or error or breakdown) occurs therein and provide the failure or error information to the EMS connected thereto. Such failure or error information may include various types. For example, the failure or error information may include various information such as abnormal operation of a specific antenna element among antenna modules of the base station, abnormal operation of a modem or data processing unit, and abnormal supply of power.

Further, each of the base stations 100a, . . . , 100l may generate base station performance information and report the base station performance information to the EMS. The base station performance information may be information for identifying a current state of the base station. For example, the base station performance information may include at least one of the number of user terminals camping for each sector within the base station, the number of user terminals communicating with each other, the sum of data rates required from user equipments in a specific cell or sector, signal strength measured from the user equipment, location information of the user equipment, or measured signal strength of a signal received from the user equipment in the base station. Here, the user's location estimation information may be estimated in various forms. For example, the base station may itself estimate a user's location based on signal strength and sector information with the user equipment. As another example, the user equipment may estimate a location of the user equipment based on signal strength with the base station. As another example, when the user equipment is capable of estimating a position using a satellite signal, such as a global positioning system (GPS), the user equipment may provide estimated position information to the base station. Further, the location of the user equipment may be estimated according to various methods. In the disclosure, there is no restriction on these various types of location estimation methods. The base station performance information may further include transmission information of a common beam or broadcast beam in addition to this information. Here, the common beam or broadcast beam may include a broadcast beam and a synchronization signal block beam (SSB beam).

Further, when a failure or error (including a breakdown or error) occurs in specific equipment of the base station, each of the base stations 100a, . . . , 100l may include a self-emergency recovery program for recovering the failure. Such an emergency recovery program will be further described with reference to FIG. 2 to be described later.

The EMSs 20a, 20b, 20c, 20d, 20e, and 20f may be connected to one or two or more base stations to become a management network entity for collecting network management information from each of the base stations. Network management information that each EMS receives from the base stations may include failure information including, for example, malfunction or damage of a specific device in the base station. Further, the network management information may include base station performance information in addition to the failure information. The network management information may include base station performance information in addition to failure information.

Each of the EMSs 20a, 20b, 20c, 20d, 20e, and 20f may obtain such network management information from each base station and provide the network management information to an analysis server connected thereto. Further, each of the EMSs 20a, 20b, 20c, 20d, 20e, and 20f may receive management control information from an analysis server connected thereto, and provide the management control information to a corresponding base station. The management control information may include control information for coping with a malfunction or damage. Thereby, the base station may perform specific control based on the management control information. For example, the base station may perform beamforming in a form excluding a specific antenna element based on the management control information.

Further, the EMS may provide network management information received from each base station to a data center 30, and provide management control information received from a specific analysis server to the data center 30.

With reference to the form illustrated in FIG. 1, an analysis server #0, 200*a* may be connected to the EMSs 20*a* and 20*b*, an analysis server #1, 200*b* may be connected to the EMSs 20*c* and 20*d*, and an analysis server #2, 200*c* may be connected to the EMSs 20*e* and 20*f*. This is only an example, and is not limited thereto. For example, in another connection method, the analysis server #0, 200*a* may be connected to the EMSs 20*a*, the analysis server #1, 200*b* may be connected to the EMSs 20*b*, 20*c*, 20*d*, and the analysis server #2, 200*c* may be connected to the EMSs 20*e* and 20*f*. In this way, a connection method between the EMSs and the analysis servers may enable various types of connection. Further, each EMS may be connected to the data center 30 to provide information collected from each base station to the data center 30.

The analysis servers 200*a*, 200*b*, and 200*c* may receive network management information including failure information provided from a specific base station through each EMS according to the disclosure, and provide management control information for controlling an operation of the corresponding base station to a corresponding base station through the EMS. Here, the failure information may be information notifying that a failure or error has occurred in a specific module within the base station. For example, the failure or error information may include diagnosis result information for various modules existing in the base station, such as a breakdown of an antenna element or a breakdown of a specific data processing unit according to the disclosure.

Further, the analysis servers 200*a*, 200*b*, and 200*c* may receive base station performance information, as network management information, from the base stations through respective EMSs according to the disclosure. Thereby, the analysis servers 200*a*, 200*b*, and 200*c* may detect and/or predict performance degradation of base station constituting the network and generate management control information to appropriately cope with the performance degradation. In this case, the analysis servers 200*a*, 200*b*, and 200*c* may generate management control information based on the policy information provided from a server 400 or updated by itself.

The network management information may include failure or error information, which is information necessary for network management for control of a base station having a breakdown and/or a failure in the analysis server. Further, the network management information may include base station performance information collected from the base station. The network management information may include base station performance information collected from the base station, for example, the number of user equipments positioned in the base station, strength and/or quality information of signals received from specific user equipments, and various types of information necessary for a normal operation of the base station in the analysis server.

Further, the network management information may include processing result information according to an emergency recovery program in response to a failure in a specific unit in the base station. For example, when a specific data processing unit fails in the base station, information for closing a path of the failed data processing unit and modifying the path to provide a service through another data processing unit may be received as network management information.

The analysis servers 200*a*, 200*b*, and 200*c* according to various embodiments of the disclosure may select an appropriate algorithm for compensating (or correcting) a malfunction or damage of a MIMO antenna element when it occurs. Thereafter, the analysis servers 200*a*, 200*b*, and 200*c* may configure beamforming pattern correction information transmitted through antennas as management control information based on the selected algorithm and provide the information to the corresponding base station through the EMS. Further, the analysis servers 200*a*, 200*b*, and 200*c* may configure an appropriate cell configuration method according to a region and a time zone according to various embodiments of the disclosure. For example, when there is a user's sudden change in cell coverage of a specific base station at a specific time (by season, month, day of week, time zone), the analysis servers 200*a*, 200*b*, and 200*c* may determine a change in a beamforming pattern of antennas for adaptively operating to this. When determining the antenna beamforming pattern change, the analysis servers 200*a*, 200*b*, and 200*c* may provide the determined pattern information to the corresponding base station through the EMS in the form of management control information. The beamforming pattern information may be beamforming pattern correction information, and the beamforming pattern correction information may include a beamforming pattern correction parameter. Further, the analysis servers 200*a*, 200*b*, and 200*c* may perform various operations for controlling each base station according to the disclosure. The control for the analysis servers 200*a*, 200*b*, and 200*c* to control the base stations will be described in more detail hereinafter.

The server 400 may include a master server 40 and a web application server 50. The master server 40 may obtain failure information, management control information, and control result information based on management control information from each of the analysis servers 200*a*, 200*b*, and 200*c*, and generate operator providing data to provide to the operator. Further, the server 400 may receive policy information for compensating (or correcting) a failure of specific equipment of the base station from the operator, and configure the policy information as information for network management. Policy information configured in the master server 40 may be provided to the analysis servers 200*a*, 200*b*, and 200*c*. Thereby, each of the analysis servers 200*a*, 200*b*, and 200*c* may control a specific equipment failure in each base station based on policy information. Further, policy information may be configured to unchangeable or updatable by the operator. If the policy information is configured to updatable, it may be configured to update or auto-update after contacting the operator.

The web application server 50 included in the server 400 may be a server that provides information stored in the master server 40 to a web client 60, for example, an operator computer and that receives specific policy information provided from the web client 60 to provide the specific policy information to the master server 40.

The web client 60 may access the web application server 50 to obtain information for managing base stations of a mobile communication network. For example, the web client 60 may receive information for various operations such as which antenna element has failed in a specific base station, information on a failure pattern due to a failure of the antenna element, when the antenna element has failed, a compensation (or correction) technique applied to compensate (or correct) a failure of the antenna element, and a compensated (or corrected) antenna pattern according to the compensation (or correction) technique. Further, the web client 60 may provide specific operation policy information, beamforming pattern correction information, and the like, to the master server 40 through the web application server 50 based on information input by the operator.

The data center 30 may receive and store network management information including failure information and base station performance information provided from each base station to the analysis servers through an EMS according to the disclosure, and management control information provided from the analysis server to the corresponding base station through an EMS. Further, when the web client 60 accesses the web application server 60 and requests information according to an operating state of a specific base station, the data center may provide information desired by the operator to the master server 40 based on previously stored information.

Figure 2:
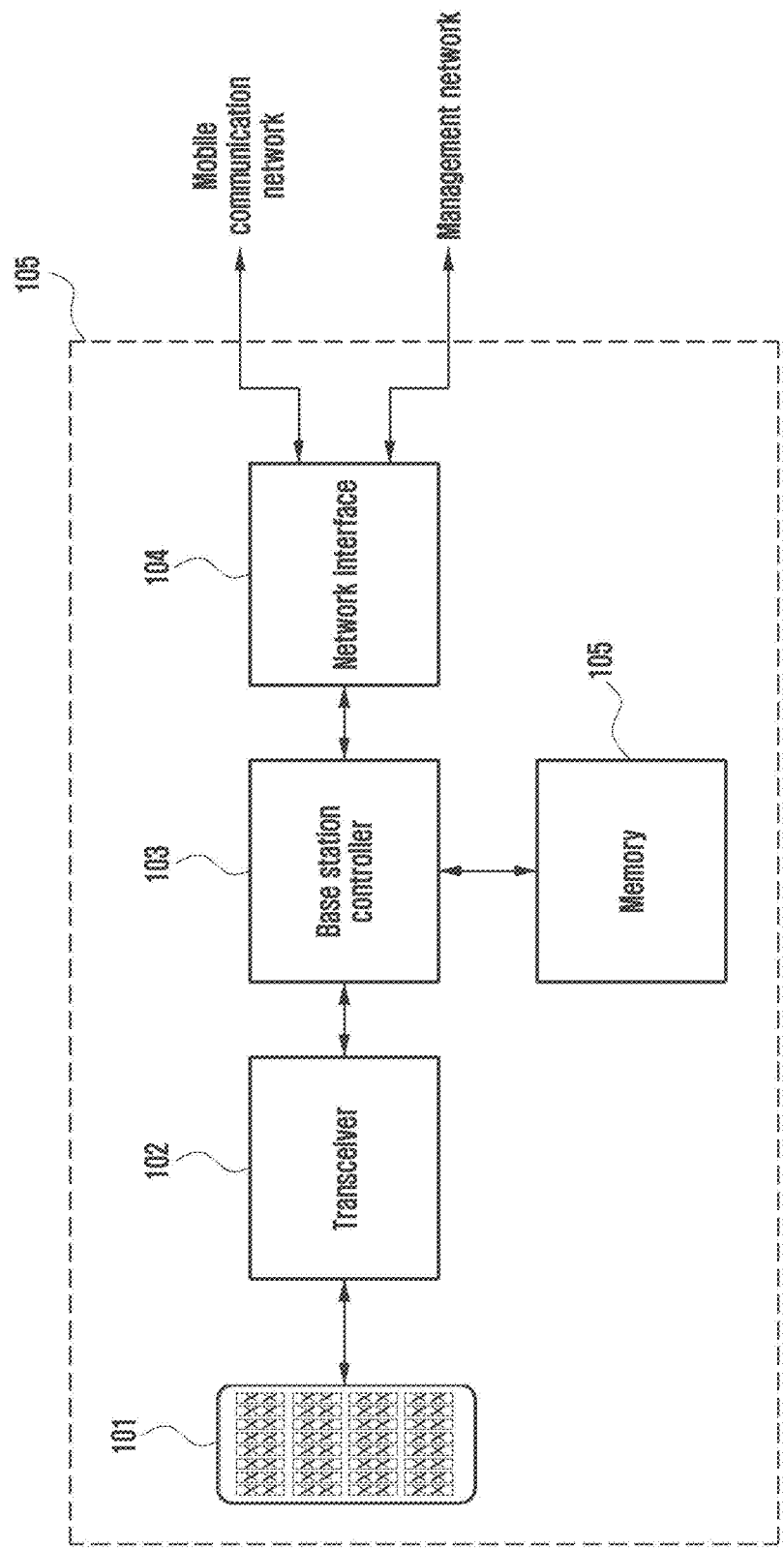
FIG. 2 is a functional block diagram illustrating a constitution of a base station device according to an embodiment of the disclosure.

FIG. 2 is a functional block diagram illustrating a constitution of a base station device according to an embodiment of the disclosure.

With reference to FIG. 2, the base station device 100 may include an antenna module 101, a transceiver 102, a base station controller 103, a network interface 104, and a memory 105.

As illustrated in FIG. 2, in the antenna module 101, a plurality of antenna elements may be arranged in a crossed form. One cross arrangement or one specific oblique line in one cross arrangement (the form of one oblique line among oblique lines indicated by X in FIG. 2) may be one antenna element. Further, the antenna module 101 of the base station is not configured with one antenna module illustrated in FIG. 2, but may include a plurality of antenna modules. Because such an extension is apparent to those skilled in the art, a further description thereof will be omitted. Further, the antenna module 101 may include a low-noise amplifier of a receiving antenna as well as an arrangement form of antenna elements. Further, when operating as an antenna transmission antenna, the antenna module 101 may include a power amplifier.

A transceiver 102 may be implemented into one or two or more modems or may be implemented into one or two or more communication processors. Each modem or communication processor of the transceiver 102 may perform a process for transmitting and receiving data to and from one user equipment or may perform a process for transmitting and receiving data to and from two or more user equipments. For example, the transceiver 102 may encode a signal to be transmitted, modulate the signal, and perform an operation of mapping a specific transmission location, for example, a transmission slot and/or a transmission frequency (subcarrier), and perform a frequency up band conversion operation with a transmission band of an LTE network or NR (5G) network. Further, the transceiver 102 may convert the received signal into a baseband signal, and demodulate and decode the signal. The transceiver 102 may perform demapping based on pre-allocated up-link information among demodulated and decoded signals, and separate each demapped data to be transmitted through corresponding bearer.

Further, the transceiver 102 may identify whether a specific antenna element of the antenna module 101 operates according to the disclosure. When a specific antenna element of the antenna module 10 does not operate normally, the transceiver 102 may provide the antenna element to a base station controller 103. In the disclosure according to FIG. 2, it is assumed that the transceiver 102 monitors an operation of a specific antenna element of the antenna module 101, but a separate monitoring device (not illustrated in FIG. 2) may be provided. For example, a feedback detection circuit (not illustrated in FIG. 2) for feeding back a portion of a signal transmitted from each antenna may be provided, and an operation state of each antenna element may be detected through the feedback detection circuit. In this case, a separate monitoring device may be configured to divide a portion of a signal received in the receiving antenna to measure a signal level received from the antenna, thereby identifying whether the receiving antenna operates. In the following description, it is assumed that such a monitoring device is included in the transceiver 102.

The base station controller 103 may be implemented with one or two or more processors. The base station controller 103 may perform the control for communication with each user equipment (UE) positioned in the base station. For example, the base station controller 103 may perform the control according to a procedure such as downlink transmission and uplink transmission of data, and random access. The base station controller 103 may control to receive failure information of the antenna module 101 received from the transceiver 102 or a separate monitoring device and to transmit the failure information to the management network through a network interface 104 according to the disclosure.

When a specific antenna element does not operate normally according to the disclosure, that is, when a failure occurs, the base station controller 103 may correct beamforming pattern information corresponding thereto based on a pattern stored in a memory 105. Such beamforming pattern information may be recovered based on an emergency recovery program. For example, beamforming pattern information may have a form to boost transmission power of antenna elements in which a failure does not occur.

When network control information for compensating (or correcting) the beamforming pattern is received from the management network through the network interface 104, the base station controller 103 may control to store the network control information in the memory 105. Further, the base station controller 103 may control the transceiver 102 and the antenna module 101 to generate a beam based on the network control information stored in the memory 105.

The network control information may include beamforming pattern correction information. Further, the beamforming pattern correction information may include beamforming pattern correction parameters for transmitting a signal to each antenna element. These beamforming pattern correction parameters will be described in more detail in an operation of the analysis server to be described later.

In general, when a failure occurs in a specific module inside the base station, for example, a specific module of the transceiver 102 or a specific element of the antenna module 101, the base station controller 103 may drive a program for emergency recovery to attempt recovery. The emergency recovery program driven by the base station controller 103 may include a method of closing a specific data path or transmitting power by boosting power through other antenna elements in the antenna module when the antenna module fails. Thereby, it may be possible to prevent the loss of power, but it may not be possible to recover for beamforming like the original beam.

Accordingly, the base station controller 103 may additionally consider the following two methods. As a first method, the base station controller 103 may have a method of reading information on a look-up table for recovering an antenna element when a failure occurs in at least one of antenna elements in the antenna module from the memory 105 and correcting a beamforming pattern of the remaining antenna elements, except for the failed antenna element. The information of the look-up table may be information itself provided as a characteristic of the antenna module by a manufacturer that manufactures the antenna module or may be information on a compensation (or correction) table generated using characteristics of the antenna elements.

As a second method, there may be a method of using information received from an analysis server according to the disclosure. When a failure occurs first in at least one antenna element in the antenna module in a specific base station, only a look-up table may exist in the memory 105 of the base station. In this case, the base station controller 103 may first perform emergency recovery by correcting a beam and increasing and transmitting transmission power based on the look-up table, and provide failure information of the antenna module to the analysis server through the EMS. Accordingly, when the base station controller 103 receives management control information from the analysis server through the EMS, the base station controller 103 may apply a beamforming pattern correction parameter included in the management control information to normal antennas of the antenna module to perform beamforming. Further, the beamforming pattern correction parameter included in the management control information may be stored in the memory 105.

The network interface 104 may be connected to a mobile communication network, for example, a circuit network node of the mobile communication network in the case of a voice call, and be connected to a packet network node of the mobile communication network in the case of a packet call. Further, the network interface 104 may be connected to a specific node of the management network, for example, the EMS according to the disclosure. Physically, the network interface 104 may include a first network interface for connecting to a mobile communication network and a second network interface for connecting to a management network. In the disclosure, these will be collectively described as the network interface 104.

Further, the base station controller 103 may generate base station performance information and provide the base station performance information to the network interface 104. The base station performance information may include the number of user terminals camping for each sector within the base station, the number of user terminals communicating with each other, the sum of data rates required from user equipments in a specific cell or sector, signal strength measured from the user equipment, location information of the user equipment that has transmitted signal strength, and the like. The base station performance information may further include transmission information of a common beam and the like in addition to this information.

In this way, the base station performance information and/or failure information may be provided to the data center 30 as well as the analysis server through the EMS.

The memory 105 may be implemented in various forms that can store data, such as a read-only memory (ROM), a random-access memory (RAM), or a hard disk. The memory 105 may include an area for storing information for the control of the base station controller 103 and various types of temporary data. Further, when a failure occurs in which a specific antenna element does not normally operate in the antenna module 101, the memory 105 may store beamforming pattern information for correcting the failure in the form of a table and/or control data. Further, the memory 105 may include control information necessary for driving an emergency recovery program. Further, according to an embodiment of the disclosure, the memory 105 may include an area for storing management control information received from an analysis server connected to an upper node, for example, an EMS, which is a node of an upper management network of the base station. Further, as described above, the memory 105 may store, as a look-up table, information on characteristics of the antenna module or correction information based on information on characteristics of the antenna module.

Figure 3:
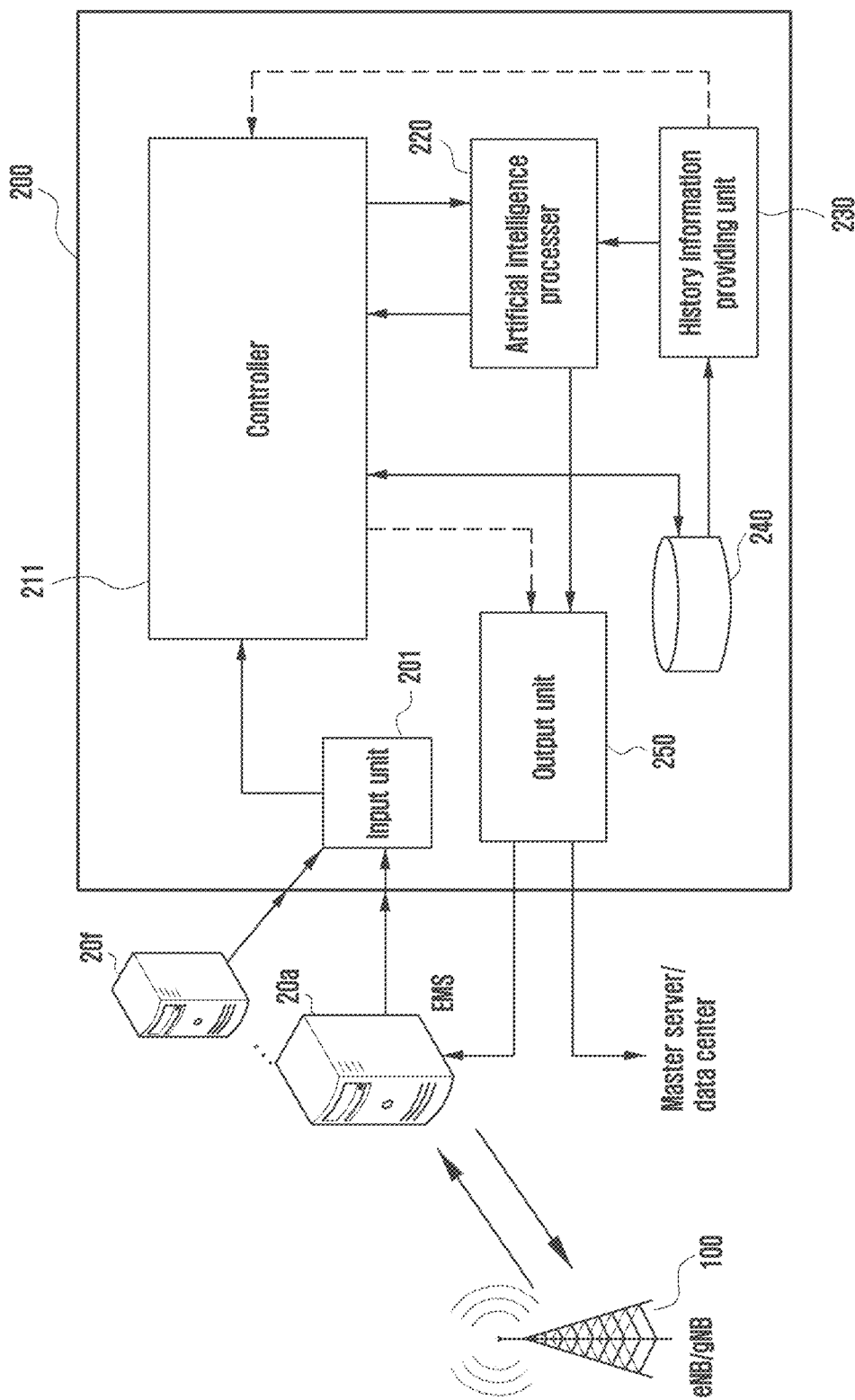
FIG. 3 is a diagram illustrating a functional block constitution of an analysis server and a connection between a base station and an EMS according to various embodiments of the disclosure.

FIG. 3 is a diagram illustrating a functional block constitution of an analysis server and a connection between a base station and an EMS according to various embodiments of the disclosure.

With reference to FIG. 3, a base station 100 exemplifies one base station by representing the plurality of base stations illustrated in FIG. 1. Further, an analysis server 200 connected to a first EMS 20a among EMSs 20a, . . . , 20f is illustrated.

As described above, the base station 100 may provide failure information of a specific antenna element to the EMS. Further, when a failure occurs in a specific antenna element, the base station 100 may include information on a beamforming pattern due to failure occurrence in the failure information and provide the information together. Further, the base station 100 may provide base station performance information including access information of each user equipment, measurement information measured by the user equipment, beamforming information of the base station, and the like to the first EMS 20a.

The first EMS 20a may configure various information such as antenna failure information received from the base station 100 and base station performance information received from the base station 100, for example, the number of accessed user equipments and measurement information measured by the user equipments as network management information and provide the information to the analysis server 200.

The analysis server 200 according to an embodiment of the disclosure may include an input unit 201, a controller 211, an artificial intelligence processer 220, a history information providing unit 230, a database 240, and an output unit 250. Further, the input unit 201 and the output unit 250 may be implemented into one input/output unit or one network interface.

The input unit 201 may receive network management information received from at least one EMS and provide the network management information to the controller 211. The first EMS 20a may be connected to a plurality of base stations, as described above. Accordingly, the network management information received from the first EMS 20a may be network management information received from a plurality of base stations. Further, because the analysis server 200 may be connected to two or more EMSs, the analysis server 200 may receive network management information from a plurality of EMSs. Accordingly, the network management information may include a base station identifier for identifying a plurality of base stations and ESM identifier information for identifying a plurality of EMSs. The input unit may provide such network management information to the controller 211.

The controller 211 may control to store or update at least a portion of the network management information received from the input unit 201 in the database 240. The controller 211 may monitor an alarm due to a failure of an antenna element included in the network management information, and analyze beamforming pattern information. Further, when the analysis server 200 includes an artificial intelligence processor 220, the analysis server 200 may provide the analyzed beamforming pattern information to the artificial intelligence processor 220 and receive beamforming pattern optimization information. When the analysis server 200 does not include an artificial intelligence processor 220, the controller 211 may perform a control for optimizing the beamforming pattern.

In FIG. 3, when the artificial intelligence processor 220 is not included, an information providing route of each block may be provided through an arrow indicated by a dotted line.

Further, the controller 211 may analyze a network topology and characteristics. Such analysis information may be provided to the artificial intelligence processor 220 when the artificial intelligence processor 220 is included, and when the artificial intelligence processor 220 is not included, the controller 211 may perform the control for beam optimization based on the corresponding information.

The artificial intelligence processor 220 may receive history information and the like in which a failure has occurred in the antenna element at the same position among the antenna modules (101 of FIG. 2) of the base station in a different cell from beamforming pattern history information of the corresponding base station or cell from the history information providing unit 230. Further, the artificial intelligence processor 220 may receive failure information of the antenna element, analyzed beamforming pattern information, and analyzed network topology and characteristic information from the controller 211. The artificial intelligence processor 220 may use a preconfigured machine learning program and generate beamforming pattern correction information to be applied to the base station based on the above information. For example, when a failure occurs in at least one specific antenna element in the antenna module 101, the artificial intelligence processor 220 may generate beamforming pattern correction information based on information received from the controller 211 and information provided (or obtained) from the history information providing unit 230.

In this way, beamforming pattern correction information generated by the artificial intelligence processor 220 may be provided to the controller 211, and the controller 211 may calculate a gain when applying the generated beamforming pattern correction information to determine whether to perform beamforming pattern correction. According to the disclosure, the beamforming pattern correction information may be configured with a beamforming pattern correction parameter. Further, the beamforming pattern correction parameter may control each antenna element to include tilt and transmission power information as well as beamforming pattern information for performing beamforming. Further, in the disclosure, the controller 211 may determine whether to perform beamforming pattern correction based on a gain. For example, if a gain when applying the generated beamforming pattern correction information is equal to or smaller than that before performing beamforming pattern correction, there is no need to perform beamforming pattern correction. However, when performing beamforming pattern correction, it may be preferable to correct the beam when there is a gain greater than or equal to a specific value (threshold) than before beamforming pattern correction.

Accordingly, when not performing beamforming pattern correction, the controller 211 may instruct (request) to re-perform beamforming pattern correction to the artificial intelligence processor 220. Such an instruction to re-perform beamforming pattern correction may be limited to perform by a preconfigured number of times. For example, the number of instructions to re-perform beamforming pattern correction may be limited to 3 or 5 times. In this way, limiting the number of instructions to re-perform beamforming pattern correction may be to prevent beamforming pattern correction from falling into an infinite loop for a specific base station and/or cell.

When performing beamforming pattern correction, if the gain is greater than or equal to a threshold, the controller 211 may configure the beamforming pattern correction parameter as management control information to control to provide the beamforming pattern correction parameter to the EMS through the output unit 250.

When it is implemented so that the controller 211 does not review the gain value, the artificial intelligence processor 220 may configure the generated parameter as management control information and directly provide the generated parameter to the EMS through the output unit 250.

In the above, the case in which the artificial intelligence processor 220 is included has been described. However, when the artificial intelligence processor 220 is not included, the controller 211 may determine optimal beamforming pattern correction information, for example, a beamforming pattern correction parameter. When the artificial intelligence processor 220 is not included, the controller 211 may determine an optimal beamforming pattern correction parameter in a preconfigured manner, configure the optimal beamforming pattern correction parameter as management control information, and provide the optimal beamforming pattern correction parameter to the EMS 20a through the output unit 250. In this case, when determining the beamforming pattern correction parameter, the controller 211 may refer to information provided from the history information providing unit 230.

Therefore, as the EMS 20a provides the management control information to the corresponding base station 100, the base station 100 may change and apply the beamforming pattern.

The controller 211 may provide a beamforming pattern correction parameter and alarm information of an antenna module of the corresponding base station to the master server (40 of FIG. 1) and/or the data center (30 of FIG. 1) based on the network management information through the output unit 250. Further, the controller 211 may provide management control information including base station/EMS information and corrected parameters of the antenna to the master server 40 and/or the data center 30 through the output unit 250.

Further, the controller 211 may additionally store a beamforming pattern correction parameter configured as the management control information in the database 240 or update and store previous information. When the database 240 is configured to store up to 10 beamforming pattern correction parameters for one specific base station, the beamforming pattern correction parameters may be additionally stored up to 10 times. Thereafter, from the 11th time, oldest data may be deleted and updated with new data.

The history information providing unit 230 may read a beamforming pattern correction history of a specific base station and a beamforming pattern correction parameter having a failure of a specific antenna element among antenna modules from the database 240 and provide it to the controller 211 or provide it to the artificial intelligence processer 220 based on the control of the controller 211.

The artificial intelligence processor 220 may adaptively calculate an optimal beam based on this. When the artificial intelligence processor 220 is not provided, the controller 211 may generate an optimal beamforming pattern correction parameter based on history information provided by the history information providing unit 230.

Figure 4A:
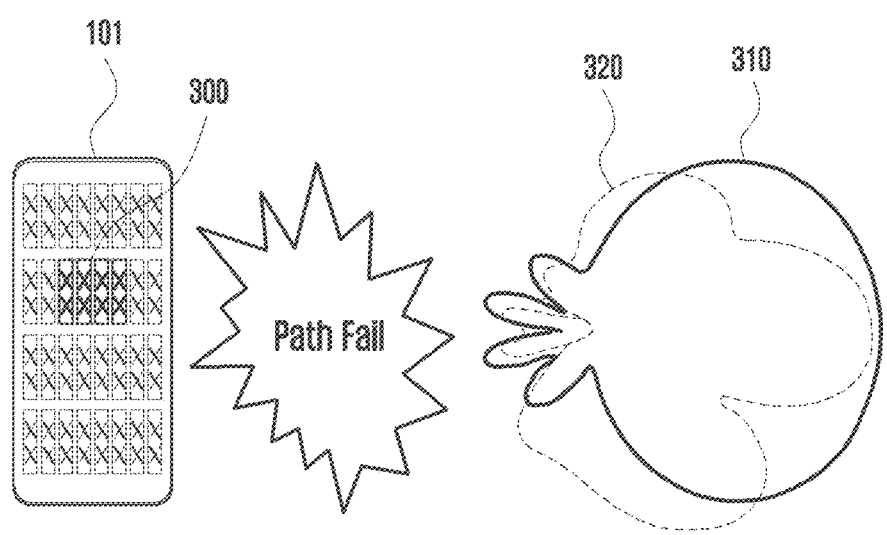
FIGS. 4A and 4B are diagrams illustrating a beamforming pattern and a pattern through beamforming pattern correction when a failure or error occurs in a specific antenna element of an antenna module according to an embodiment of the disclosure.
Figure 4B:
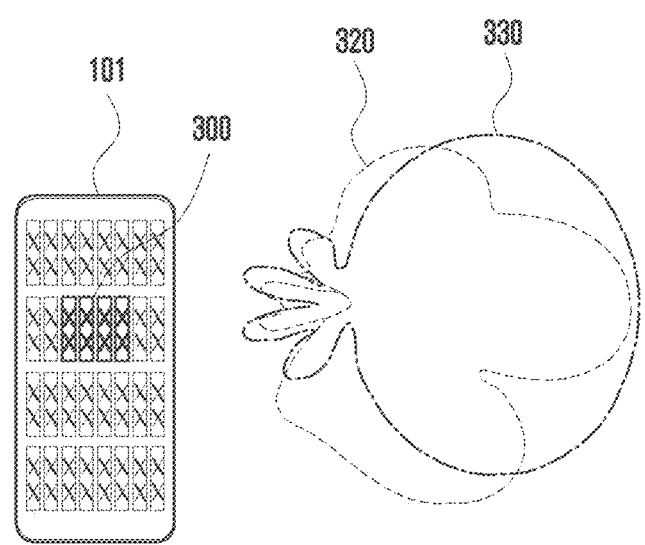

FIGS. 4A and 4B are diagrams illustrating a beamforming pattern and a pattern through beamforming pattern correction when a failure occurs in a specific antenna element of an antenna module according to an embodiment of the disclosure.

First, FIG. 4A illustrates a case in which a failure occurs in antenna elements positioned at a specific location in the antenna module 101 as indicated by reference numeral 300. FIG. 4A illustrates a case in which a failure occurs in both a horizontal axe and a vertical axe of the antenna element, but even when only one specific horizontal axis antenna element fails and/or a specific one vertical axis antenna element fails, correction may be made according to the disclosure. Further, even when a failure has occurred in one specific horizontal axis antenna element and a failure has occurred in another specific one vertical axis antenna element, the same may be applied.

When all of the antenna elements operate normally, the beamforming pattern is exemplified by reference numeral 310. The beamforming pattern illustrated in FIG. 4A exemplifies a common beam and/or broadcast beam and/or SSB beam. In this case, when a failure occurs in which specific antenna elements do not normally operate, as indicated by reference numeral 300, the beamforming pattern may be transformed into a shape indicated by reference numeral 320. Reference numeral 320 is only an example, and may be more seriously distorted, and may not be significantly affected in some cases.

As described above, when a specific antenna element does not operate normally, the base station controller (103 of FIG. 2) may recognize an abnormal operation of the antenna element through the transceiver (102 of FIG. 2) or a separate detection circuit. Accordingly, the base station controller 103 may generate failure information of the antenna element illustrated in FIG. 4A and provide the failure information to the EMS.

Accordingly, the EMS includes a base station identifier and an EMS identifier, and may provide failure information received from the base station controller 103 and beamforming pattern information due to occurrence of the failure (if provided by the base station), and various types of information received from the base station 100, for example, network management information including the number of accessed user equipments and measurement information measured by the user equipments to the analysis server 200.

Accordingly, the analysis server 200 of FIG. 3 described above may generate beamforming pattern correction information generated by the artificial intelligence processer 220 or the controller 211 of the analysis server 200 as management control information and provide the beamforming pattern correction information to the EMS Accordingly, the EMS may provide beamforming pattern correction information including at least a beamforming pattern correction parameter among the management control information to a corresponding base station.

FIG. 4B illustrates a corrected beamforming pattern when beamforming pattern correction information is applied. When the same specific X-pol antennas do not operate normally as in FIG. 4A, the base station may multiply and transmit normal antennas by a beamforming pattern correction factor using beamforming pattern correction information to transmit a common beam and/or broadcast beam and/or SSB beam, as indicated by reference numeral 330.

In this case, the common beam and/or broadcast beam and/or SSB beam of reference numeral 330 may have the same or substantially similar shape as a normal beam 310 of FIG. 4A described above.

Hereinafter, operations in the analysis server according to the methods described above with reference to FIGS. 1 to 4A and 4B will be described. Hereinafter, the analysis server for recovering each beamforming pattern according to the following five situations will be described from the viewpoint of the operation.

First, when a breakdown occurs in at least one antenna element of the antenna module, an impact of beamforming pattern distortion and a control method for optimal beamforming pattern recovery will be described.

Second, a control method for detecting a cell that does not meet an expected performance in a continuous operation process and applying an optimized beamforming pattern through problem analysis in the corresponding cell will be described.

Third, when a breakdown occurs in at least one antenna element of the antenna module through a linked operation of the above first method and second method, a control method for preventing deterioration of a service quality of the network through recovery of the beam and analysis of the result after the action will be described.

Fourth, a method of analyzing a beamforming pattern based on a configured policy and performing update based on data statistics for beam optimization will be described.

Fifth, in a continuous operation process, a method for predicting occurrence of a network problem in advance and analyzing and applying a beamforming pattern appropriate for the situation will be described.

Figure 5:
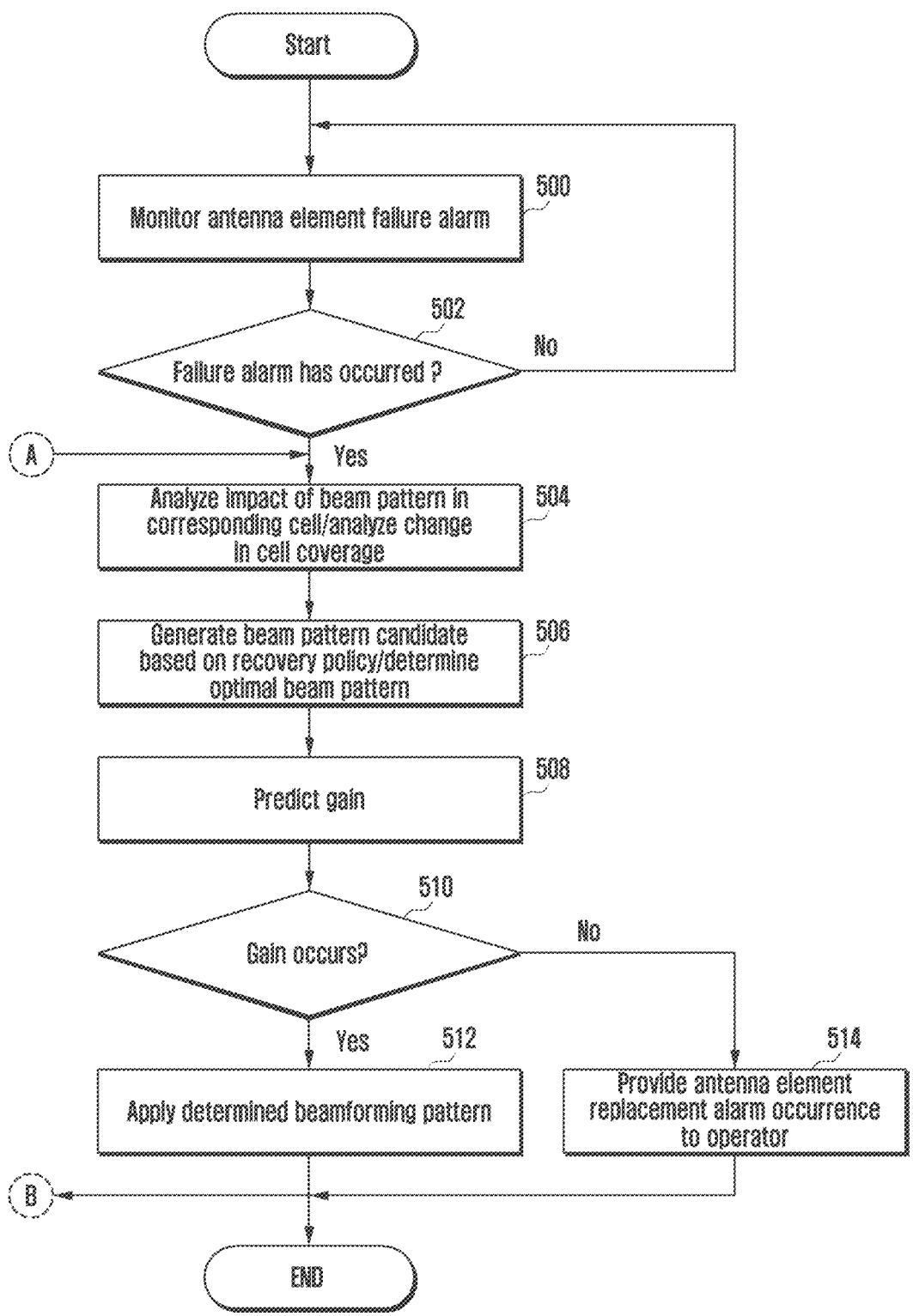
FIG. 5 is a control flowchart for minimizing an impact of beamforming pattern distortion and recovering an optimized beamforming pattern in an analysis server that detects occurrence of a breakdown in at least one antenna element of an antenna module according to an embodiment of the disclosure.

FIG. 5 is a control flowchart for minimizing an impact of beamforming pattern distortion in an analysis server that detects occurrence of a failure in at least one antenna element of an antenna module and for recovering an optimized beamforming pattern according to an embodiment of the disclosure.

With reference to FIG. 5, the controller 211 of the analysis server 200 may receive network management information from the input unit 201 in operation 500. Such network management information may include failure information provided from each base station connected to the EMS, as described above. Further, the network management information may include failure information received from each base station connected to the EMS and various other information. Various information received from the base stations may include base station performance information. The base station performance information may be information for identifying a current state of the base station. For example, the base station performance information may include the number of user terminals camping for each sector within the base station, the number of user terminals communicating with each other, the sum of data rates required from user equipments in a specific cell or sector, signal strength measured from a user equipment, and location information of the user equipment that has transmitted signal strength. The base station performance information may further include transmission information of a common beam and/or broadcast beam and/or SSB beam in addition to this information.

According to various embodiments of the disclosure, the controller 211 may identify a base station in which a breakdown (or failure or error) has occurred in an antenna element among base stations connected to a specific EMS obtained from network management information in operation 502, and identify which part of the antenna element of the antenna module corresponding to which sector of the base station has a failure. The base station and the EMS may be identified using an EMS identifier and an identifier of the base station, as described above. Further, the base station may provide specific information on which antenna module of a specific base station has a failure (including breakdown and/or error).

For example, it is assumed that the base station is divided into three sectors of a first sector, a second sector, and a third sector, and that a MIMO antenna module for covering the first sector is an 8×8 X-pol antenna. In this case, in order to specify an antenna element that a failure has occurred in the antenna module, the base station may provide a failure by designating that a failure has occurred in an X-pol antenna element at a 4th position in a 3rd column and an X-pol antenna element at a 4th position in a 5th column in 8×8 antenna modules of a 1st sector in failure information. Accordingly, because the network management information may include such failure information, the controller 211 of the analysis server may specify a location of an antenna element in which a failure has occurred in the base station, a specific sector of the base station, and an antenna module corresponding thereto.

As a result of the inspection in operation 502, if a breakdown occurs in an antenna element of a specific base station, the controller 211 may proceed to operation 504. Otherwise, the controller 211 may continue to perform operation 500. Further, as another example, if a breakdown occurs in another part of the received network management information as a result of the inspection in operation 502, the controller 211 may perform a process for this. FIG. 5 is a control flowchart for a case in which an antenna element fails according to an embodiment of the disclosure; thus, other cases will not be described.

In operation 504, the controller 211 may analyze an impact of a beamforming pattern in a corresponding cell due to a failed antenna element based on failure information included in the network management information, and analyze a change in cell coverage. In this case, when analyzing an impact of the beamforming pattern of the cell and analyzing a change in cell coverage, the controller 211 may consider together regional conditions. For example, when the base station is installed in the city center, the controller 211 may analyze an impact of the beamforming pattern and analyze a change in cell coverage in consideration of factors such as a height at which the base station is installed and a location and height of a building positioned inside coverage of the base station. As another example, when the base station is positioned in a mountainous area, the controller 211 may analyze the impact of the beamforming pattern using a location of the base station and a topographic map of a mountain within a communication area from the base station, and analyze a change in cell coverage. Such geographic information may be previously stored in the database 240.

Thereafter, the controller 211 may generate a beamforming pattern candidate based on a preconfigured recovery policy in operation 506. In this case, a case in which the artificial intelligence processor 220 is applied and a case in which the artificial intelligence processor 220 is not applied will be separately described.

When the artificial intelligence processor 220 is employed, the artificial intelligence processor 220 may identify first whether there is a history of occurrence of a failure (which may include an error or breakdown) of the same antenna element in the antenna module based on a machine learning program. In this case, the artificial intelligence processer 220 may receive history information from the database 240 through the history information providing unit 230 and examine the previous failure history of the same antenna element. Thereafter, the artificial intelligence processer 220 may generate optimal beamforming pattern candidates based on policy information provided from the controller 211, failure (breakdown) information of the antenna element, and other base station performance information. Further, in this case, the optimal beamforming pattern candidates may be two or more beamforming patterns. In this case, a beamforming pattern having a greatest gain among two or more beamforming patterns may be determined as a final beamforming pattern.

When the artificial intelligence processor 220 generates a beamforming pattern candidate, if a breakdown has occurred in at least one antenna element among antenna modules of the base station based on previously learned information, the artificial intelligence processer 220 may generate beamforming pattern correction parameters for performing appropriate beamforming. Further, when the beamforming pattern correction parameter is applied, the artificial intelligence processer 220 may generate beamforming information of the corresponding base station. The artificial intelligence processer 220 may provide beamforming pattern correction information including beamforming pattern correction parameters generated in this way and beamforming pattern information in a state in which the beamforming pattern correction is made to the controller 211.

If the artificial intelligence processer 220 is not included, the controller 211 may request history information from the database 240 to the history information providing unit 230, and examine the history of occurrence of failures under the same conditions based on history information provided by the history information providing unit 230. If there is no history information of the same condition, the controller 211 may generate a beamforming pattern correction parameter based on radiation pattern information of the antenna module stored in the database 240. Further, the controller 211 may obtain beamforming pattern information to which a beamforming pattern correction parameter is applied.

Beamforming pattern candidates obtained by performing the above-described artificial intelligence processor 220 or the controller 211 may be beamforming patterns generated while changing parameters to be applied to each antenna element in order to perform beamforming with only the remaining antenna elements, except for the failed antenna element. Accordingly, the controller 211 may configure, as an optimal beamforming pattern, an original beamforming pattern, that is, a candidate pattern having a form closest to the beamforming pattern in which the antenna module normally operates among the generated beamforming patterns. Further, in this case, the artificial intelligence processer 220 may generate two or more beamforming patterns. In this case, the artificial intelligence processor 220 may determine a beamforming pattern having a greatest gain among two or more beamforming patterns as a final beamforming pattern.

Thereafter, in operation 508, the controller 211 may predict a gain by comparing a beamforming pattern generated in a state in which a breakdown (or failure or error) occurs in a specific antenna element of the antenna module and a corrected beamforming pattern beamformed with only normal antenna elements by excluding a failed antenna element according to the disclosure.

After predicting the gain in operation 508, the controller 211 may identify whether a gain actually occurs in operation 510. The inspection of gain generation may use at least one of the following methods.

First, the controller 211 may identify whether there is a coverage difference greater than or equal to a preconfigured threshold. For example, when the base station transmits a common beam and/or broadcast beam and/or SSB beam, there may be little coverage difference between a corrected beam and a pre-correction beam, that is, when beamforming is performed while ignoring occurrence of failure. In this case, the controller 510 may determine that no gain has occurred. Further, in the first case, geographical factors may be additionally taken into account. For example, there may be an area in which there is no gain even though beamforming is physically performed due to a specific building or a mountainous area. It may be determined that there is no gain, if the corrected beam has an effect only in these areas.

Second, the gain may be determined according to the distribution of users. For example, there may be a region in which a large number of users are distributed and a region in which there are few users within the same sector within one base station. In this case, when beamforming is performed without correction, that is, while ignoring occurrence of a failure, the beam may be transmitted strongly in a region where a large number of users are distributed, and a beam may be transmitted weakly in a region where there are few users. In this case, even if the corrected beam slightly loses signal transmission in a region where there are many users, beamforming may be performed to facilitate signal transmission to a region where there are few users. In this case, based on the policy, it may be determined that a gain has occurred or that a gain has not occurred.

Further, there may be various factors that may be considered regarding whether there is a gain of the beam. In an embodiment of the disclosure, all cases may be included.

If a gain occurs as a result of identification in operation 510, the controller 211 may proceed to operation 512. However, if no gain occurs as a result of identification in operation 510, the controller 211 may proceed to operation 514. When proceeding to operation 512, the controller 510 may generate management control information to apply the determined beamforming pattern and provide the management control information to a corresponding base station through the EMS. In this way, the beamforming pattern generated as the management control information may be beamforming pattern information for self-healing. Further, after operation 512, although not illustrated in FIG. 5, the controller 510 may notify the operator that a failure has occurred in a specific antenna module of the corresponding base station.

When proceeding to operation 514, the controller 211 may generate an antenna element replacement alarm and provide the alarm to the master server (40 of FIG. 1) in order to provide the alarm to the operator.

When the above-described artificial intelligence processor 220 stores generated beamforming pattern correction information in the database 240, that is, the beam adjustment parameters, the controller 211 may additionally insert an identifier (flag) to identify that the beamforming pattern has been selected in operation 512. Further, when the artificial intelligence processor 220 generates two or more beamforming patterns, the artificial intelligence processor 220 may insert an identifier to identify that the beamforming pattern has been selected among the generated beamforming patterns, and insert an identifier to identify that it has not been selected to the unselected beamforming patterns. In this case, if necessary, the beamforming pattern correction parameter and time information may be stored together. Thereby, too old beamforming pattern information may provide a basis for deletion from the database 240. Here, one beamforming pattern correction parameter may mean a beamforming pattern correction parameter set to be provided to each antenna element in order to correct one beamforming pattern.

As described above, data stored in the database 240 may include the following information.

(1) Base station identifier
(2) EMS identifier
(3) Model or type of MIMO antenna module
(4) Antenna element location information where a failure (including error and/or breakdown) has occurred in the MIMO antenna module
(5) Selected beamforming pattern correction parameter (including identifier information indicating that it has been selected)
(6) Unselected beamforming pattern correction parameter (including an identifier indicating that it has not been selected)
(7) Stored time information When the analysis server 200 does not include an artificial intelligence processor 220, the controller 211 may generate one or two or more beamforming pattern correction parameters, divide the selected beamforming pattern correction parameter and the unselected beamforming pattern correction parameter among them, and control to store the parameters in the database 240. Even in this case, the controller 211 may store together the beamforming pattern correction parameter and time information.

Further, when proceeding from operation 510 to operation 514, the controller 211 may store antenna failure information in the database 240. Even in this case, time information and antenna failure information may be stored together.

In FIG. 5 described above, when a breakdown condition occurs in at least one antenna element among antenna modules of a specific base station, it is an operation after obtaining information on this from the analysis server. Accordingly, the analysis server may severely analyze performance degradation caused by beamforming pattern distortion, and attempt to recover to be as similar to an original beam as possible through various beamforming patterns. In this case, more appropriate beamforming pattern recovery may be possible by analyzing a gain obtainable through a recovery beamforming pattern.

Further, in FIG. 5 according to an embodiment of the disclosure, even if the beamforming pattern correction parameter is applied to the antenna elements that operate normally in software, when a recovery gain of the beamforming pattern is not large, an alarm may be provided to the operator. This allows the operator to quickly replace the hardware, i.e., the antenna module itself, based on alarm information provided from the analysis server.

Figure 6:
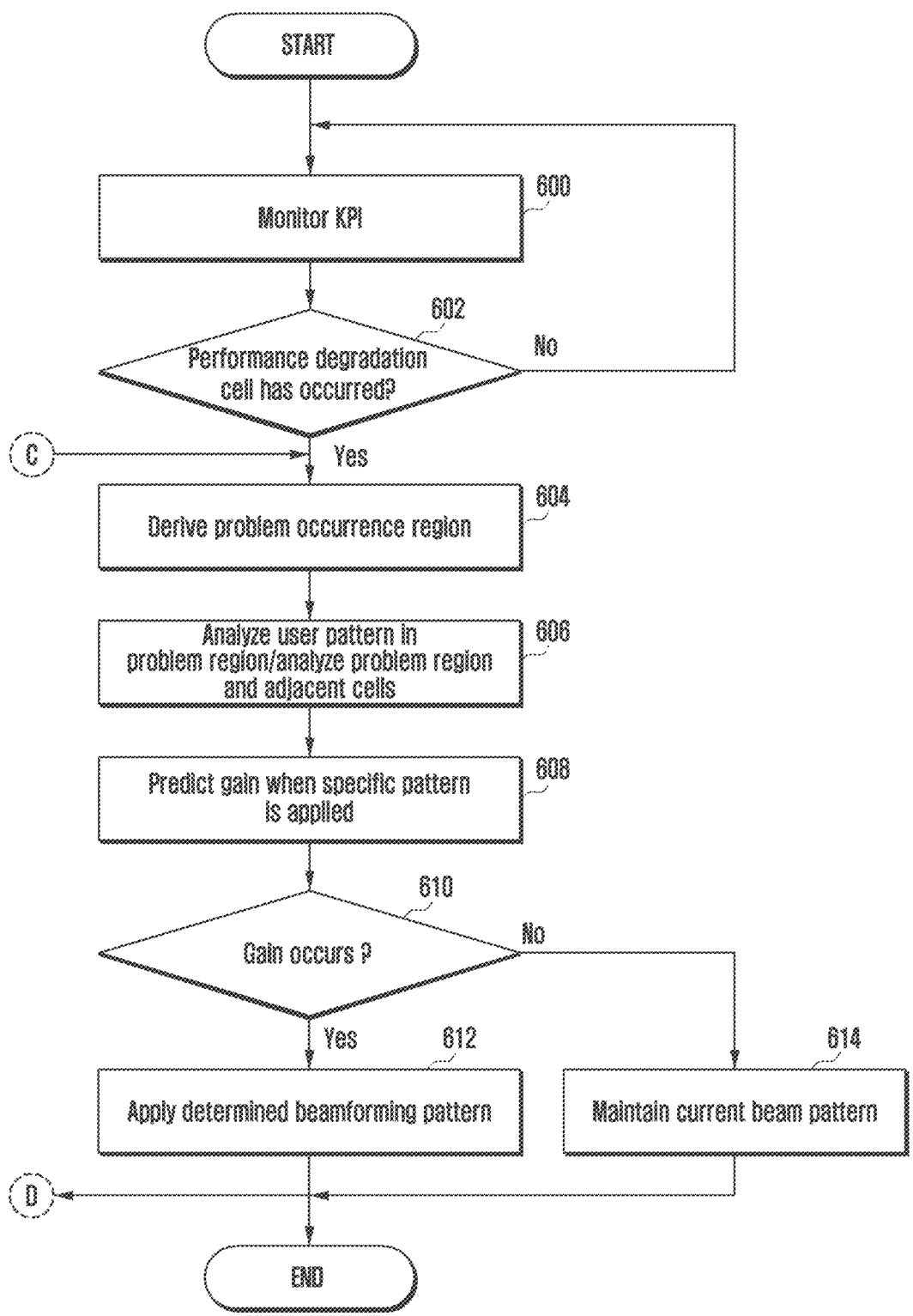
FIG. 6 is a control flowchart for optimizing a beam of a base station at all times in an analysis server according to another embodiment of the disclosure.

FIG. 6 is a control flowchart for optimizing a beam of a base station at all times in an analysis server according to another embodiment of the disclosure.

With reference to FIG. 6, the controller 211 of the analysis server 200 may monitor a key performance indicator (KPI) based on network management information received through the input unit 201. As described above, the network management information may include failure information received from each base station connected to the EMS and various other information. Various types of information received from the base stations may include base station performance information. The base station performance information may be information for identifying a current state of the base station. For example, the base station performance information may include at least one of the number of user terminals camping for each sector within the base station, the number of user terminals communicating with each other, the sum of data rates required from user equipments in a specific cell or sector, signal strength measured from a user equipment, location information of the user equipment, or measured signal strength of a signal received from the user equipment in the base station. The base station performance information may further include transmission information of a common beam and/or broadcast beam and/or SSB beam in addition to this information.

The controller 211 may monitor a key performance indicator (KPI) based on the network management information in operation 600, and proceed to operation 602 to identify whether there is a cell in which performance degradation has occurred. Here, performance degradation may exemplify, for example, a case where at least one of the following conditions is satisfied.

First, a case in which interference rapidly increases due to a rapid increase in the number of user equipments in a specific region may include a case in which deterioration of a signal to interference noise ratio (SINR) value is reported from more than a preconfigured number of user equipments.

Second, there may be a case where data transmission is impossible at a preconfigured maximum data rate. This may be caused by various factors such as an increase in the number of user equipments or other factors, for example, long-time occupation of construction equipment, increased interference from other adjacent base stations, and/or signal transmission of other broadcasting equipments while other broadcasting equipments, for example, skywave and terrestrial equipments occupy in the corresponding cell for a long time.

The example described above is only an example for describing degradation of a cell performance according to the disclosure, and other various cases may exist.

The disclosure is intended to cope with the case where there is a cell whose performance is degraded due to the above case or other reasons. When there is a cell in which performance degradation occurs as a result of monitoring in operation 602, the controller 211 according to an embodiment of the disclosure may proceed to operation 604. The controller 211 may derive (identify) a problem region in operation 604. Thereafter, in operation 606, the controller 211 may analyze a user pattern in the problem region and analyze the problem region and adjacent cells.

Here, the problem region may be a cell, a base station, or a specific sector of the base station in which performance degradation has occurred. Further, a user pattern in the problem region may be information such as whether the user equipment mainly uses data transmission, data reception, reception of broadcast information, or voice communication. In this case, when data transmission and reception are mainly performed, pattern information such as whether data is used bursty or continuously may be further used for analysis.

When a small amount of data is bursty transmitted and received, it may be a communication service such as text and/or photo transmission, and when data is continuously received, a specific streaming service may be provided. The controller 211 of the analysis server 200 may analyze the user's pattern based on characteristics of a service provided to the user equipment, as described above.

In FIG. 6, a case in which operation 606 is performed in the base station 211 and a case in which operation 606 is performed in the artificial intelligence processor 220 will be separately described.

First, when operation 606 is performed in the artificial intelligence processor 220, the artificial intelligence processor 220 may receive problem occurrence region information from the controller 211. Further, in this case, the artificial intelligence processor 220 may receive together information such as a user pattern for the problem region. The user pattern information may be information included in the network management information.

The artificial intelligence processor 220 according to various embodiments of the disclosure may analyze a user's pattern in a problem region, as described above. Further, the artificial intelligence processor 220 may receive the most similar type of user pattern information stored in the database 240 through the history information providing unit 230, and receive beam parameter correction information stored in the database 240

The artificial intelligence processor 220 may generate at least one beamforming pattern correction parameter to be applied to a base station in which performance degradation has occurred based on the information received in operation 606. When the beamforming pattern correction parameter is generated, a user pattern for an adjacent cell, the number of users and the like may be considered together. The beamforming pattern correction parameter may be a parameter for controlling beamforming to be a form for more efficiently and stably transmitting a signal based on a user pattern when all antenna modules operate normally. The artificial intelligence processor 220 may provide beamforming pattern information when the beamforming pattern correction parameter is applied together with the beamforming pattern correction parameter to the controller 211. Further, in this case, the artificial intelligence processor 220 may generate two or more beamforming patterns. In this case, the artificial intelligence processor 220 may determine a beamforming pattern having a greatest gain among two or more beamforming patterns as a final beamforming pattern.

Further, when the artificial intelligence processor 220 generates a new beamforming pattern correction parameter based on current information and previous history information, the artificial intelligence processor 220 may store information on a generation condition and a beamforming pattern correction parameter generated in the database 240 directly or through the history information providing unit 230. As another example, because the beamforming pattern correction parameter generated by the artificial intelligence processor 220 is unselected information, the artificial intelligence processor 220 may not directly store the beamforming pattern correction parameter, but configure to provide the beamforming pattern correction parameter to the controller 211 and to store the beamforming pattern correction parameter in the database 240 only when it is selected by the controller 211.

Hereinafter, a case in which the artificial intelligence processor 220 is not included will be described. In operation 606, the controller 211 may consider whether the same user patterns exist even in a region adjacent to a base station (a neighboring base station, a sector, or cell) in which the performance degradation occurs. In this case, when location information of user equipments, for example, user equipments receiving a data service may be obtained, the controller 211 may consider together. Further, in this case, the controller 211 may generate two or more beamforming patterns. In this case, the controller 211 may determine a beamforming pattern having a greatest gain among two or more beamforming patterns as a final beamforming pattern.

Thereafter, the controller 211 may predict a gain of a determined beamforming pattern among two or more beamforming patterns described above when a specific pattern is applied in operation 608. The beamforming pattern determined here may have a form different from the pattern in FIG. 5 described above. The case of FIG. 6 is a case in which all antenna elements of the antenna module in the base station operate normally. Accordingly, although all antenna elements operate normally, the beamforming pattern may be modified in various forms, and a gain may be predicted by comparing each of these modified patterns with an original beamforming pattern, that is, a normal beamforming pattern.

In operation 610, when a specific beamforming pattern among newly updated beamforming patterns is applied, the controller 211 may identify whether a gain occurs. The generation of the gain may take various forms, such as extension of coverage and/or reduction of interference at a user equipment and/or reduction of transmission power transmitted to the user equipment. Conditions for generating such a gain may be determined based on policy information predetermined by the operator. The policy information may be configured to use, for example, at least one or two or more of the conditions exemplified above, or other conditions.

If a gain occurs as a result of the inspection in operation 610, the controller 211 may proceed to operation 610, and if no gain occurs, the controller 211 may proceed to operation 614.

If a gain occurs based on the identification result in operation 610, the controller 211 may apply the determined beamforming pattern in operation 612. Information corresponding to the determined beamforming pattern may be configured as management control information and be provided to a corresponding base station through the EMS. Here, the determined beamforming pattern may be self-healing beamforming information. However, if no gain occurs as a result of identification in operation 610, the controller 211 may maintain a current beamforming pattern in operation 614.

When the aforementioned artificial intelligence processer 220 stores generated beamforming pattern correction information in the database 240, that is, beam adjustment parameters, the controller 211 may additionally insert an identifier (flag) to identify that the selected beamforming pattern has been selected in operation 612. Further, when two or more beamforming patterns are generated by the artificial intelligence processor 220, the controller 211 may insert an identifier to identify that the selected beamforming pattern has been selected among the generated beamforming patterns, and insert an identifier to identify that unselected beamforming patterns have been not selected. In this case, the controller 211 may store together the beamforming pattern correction parameter and time information, if necessary. Thereby, a basis for deleting too old beamforming pattern information from the database 240 may be provided. Here, one beamforming pattern correction parameter may mean a beamforming pattern correction parameter set to be provided to each antenna element in order to correct one beamforming pattern.

As described above, data stored in the database 240 may include the following information.
(1) Base station identifier
(2) EMS identifier
(3) Model or type of MIMO antenna module
(4) Antenna element location information where a failure (including error and/or breakdown) has occurred in the MIMO antenna module
(5) Selected beamforming pattern correction parameter (including identifier information indicating that it has been selected)
(6) Unselected beamforming pattern correction parameter (including an identifier indicating that it has not been selected)
(7) Stored time information When the analysis server 200 does not include an artificial intelligence processor 220, the controller 211 may generate one or two or more beamforming pattern correction parameters, divide the selected beamforming pattern correction parameter and the unselected beamforming pattern correction parameter among the beamforming pattern correction parameters, and control to store the parameters in the database 240. Even in this case, the controller 211 may store together the beamforming pattern correction parameter and time information.

Further, when proceeding from operation 610 to operation 614, the controller 211 may store beamforming pattern correction parameter information in the database 240. Even in this case, the controller 211 may store together time information and antenna beamforming pattern correction parameter information.

The analysis server described above in FIG. 6 may compare a target performance configured in a planning step after on-air of the base station site and a performance at the time of actual operation. When a target performance is not reached based on the comparison result, the analysis server may provide appropriate beamforming pattern correction information to a corresponding base station to change the beamforming pattern, thereby controlling the performance close to the target performance.

Figure 7:
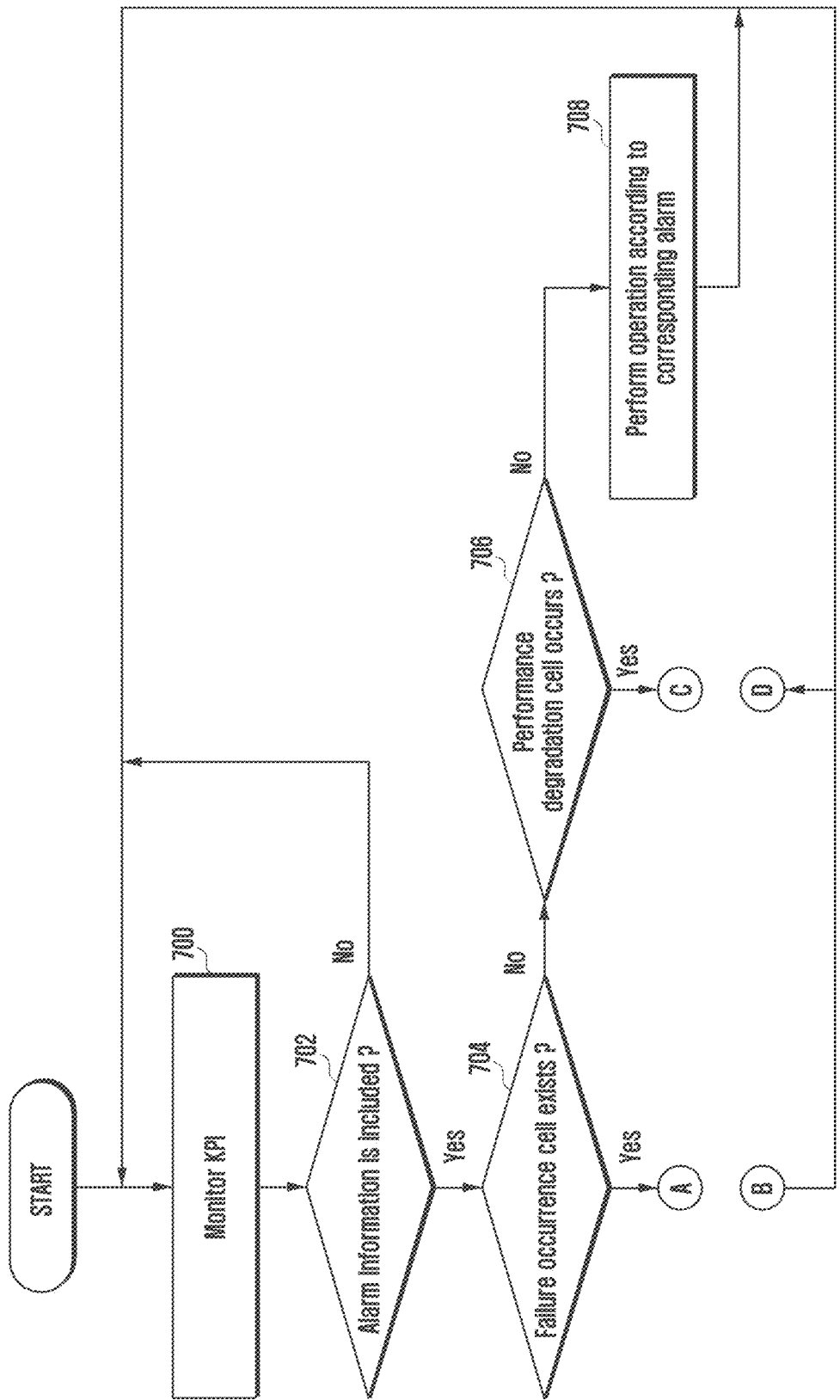
FIG. 7 is a flowchart for control in case of breakdown/performance degradation of a base station in an analysis server according to another embodiment of the disclosure.

FIG. 7 is a flowchart for control in case of a breakdown/performance degradation of a base station in an analysis server according to another embodiment of the disclosure.

With reference to FIG. 7, the controller 211 may receive network management information from the input unit 201 in operation 700. Further, in operation 700, the controller 211 may examine failure information or base station performance information included in the network management information.

The failure information and the base station performance information may be information described with reference to FIGS. 5 and 6. The controller 211 may monitor such information included in the network management information, and identify whether alarm information is included based on the network management information in operation 702. Here, the alarm information may include at least one of failure or error (breakdown) information of an antenna module of a specific base station and/or performance degradation information of a specific base station. If alarm information is included, the controller 211 may proceed to operation 704 to identify whether the alarm information is a failure alarm. That is, the controller 211 may identify whether a breakdown (failure or error) has occurred in at least one antenna element among antenna modules or the entire antenna module in a specific antenna module in the base station.

When a breakdown occurs in the antenna element of a specific base station as a result of the inspection in operation 704, the controller 211 may perform an operation A. The operation A of FIG. 7 may mean proceeding to the operation 504 of FIG. 5 described above. Therefore, the controller 211 may proceed to an operation B after performing operations 504, 506, 508, 510, and 512 described above or may proceed to an operation B after performing operations 504, 506, 508, 510, and 514. That is, after controlling the operation according to the failure described with reference to FIG. 5, the controller 211 may continue to monitor operation 700.

If a failure alarm does not occur in operation 704, the controller 211 may proceed to operation 706 to identify whether a cell performance degradation alarm has occurred. The cell performance degradation alarm may be a case in which performance degradation occurs in a specific sector of a specific base station or a specific cell of a specific base station, as described with reference to FIG. 6. In this case, the controller 211 may perform an operation C. The operation C may mean proceeding to operation 604 of FIG. 6 described above.

Accordingly, the controller 211 may proceed to an operation D after performing operations 604, 606, 608, 610, and 612 or may proceed to an operation D after performing operations 604, 606, 608, 610, and 614. That is, the controller 211 may continue to monitor operation 700 after performing a control procedure for resolving cell performance degradation, as illustrated in FIG. 6. In this case, when it is configured to select a current beam, as in operation 614 for the cell performance degradation alarm, the controller 211 may configure to ignore the cell performance degradation alarm of the corresponding cell for a predetermined time. Thereby, unnecessary repetition of operation 706 may be prevented.

However, if cell performance degradation alarm does not occur as a result of the inspection in operation 706, the controller 211 may proceed to operation 708 to perform a function corresponding to the alarm. That is, in the control flowchart of FIG. 7, in operation 702, an alarm has already occurred, in operation 704, an antenna breakdown is identified, and in operation 706, a cell performance alarm is identified. Accordingly, in the disclosure, an additional description of other alarm occurrence cases, that is, operation 708, will be omitted.

After performing operation 708, the controller 211 may continue to monitor operation 700 again.

Figure 8:
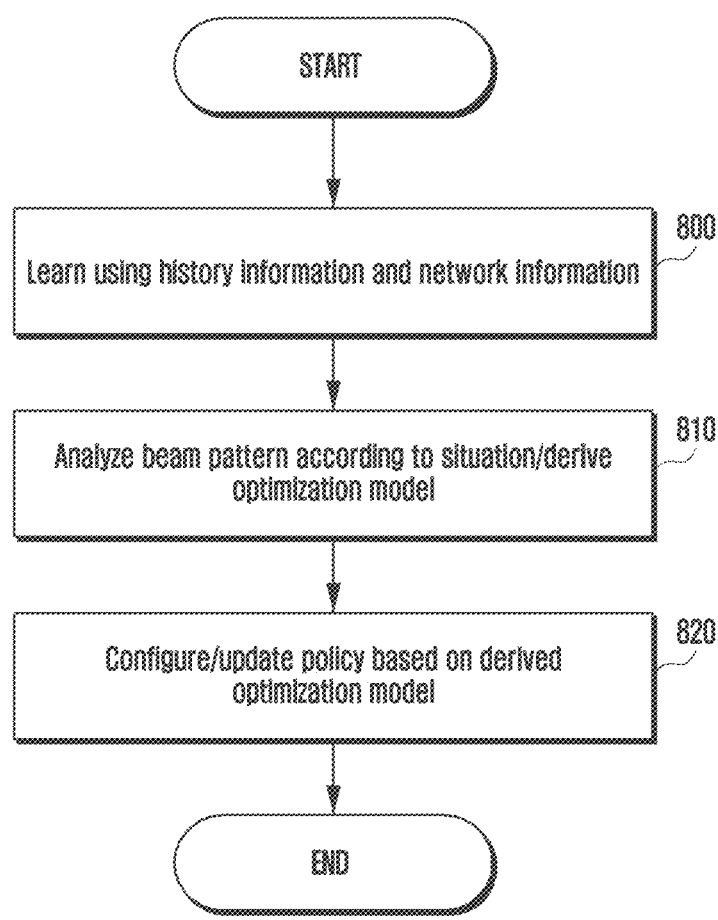
FIG. 8 is a control flowchart in case of automatically updating a policy of a beamforming pattern in an analysis server or a master server according to another embodiment of the disclosure.

FIG. 8 is a control flowchart automatically updating a policy of a beamforming pattern in an analysis server or a master server according to another embodiment of the disclosure.

In the control flow diagram of FIG. 8 according to an embodiment of the disclosure, an operation performed by the analysis server 200 will be described as an example. However, the master server 40 may determine the policy of the beamforming pattern from the same viewpoint. Further, when the beamforming pattern policy is determined in the master server 40, it should be provided to each of the analysis servers 200a, 200b, ..., 200c.

Further, in the following description, it is assumed that the control subject of the flowchart of FIG. 8 is the controller 211. However, when the analysis server 200 includes an artificial intelligence processor 220, the control may be performed by the artificial intelligence processor 220.

With reference to FIG. 8, the controller 211 may perform machine learning using history information and network information, for example, network management information in operation 800. Here, history information may include at least one of history information of a beamforming pattern applied to each base station or beamforming pattern correction information for corresponding to a breakdown (or failure or error) of a specific antenna module. Further, the network management information may include base station performance information, as described above. Further, the network information may additionally include information on impacts from adjacent cells in addition to network management information. The controller 211 may perform machine learning on snapshot information using the above information in operation 800. Here, the snapshot information may be antenna element failure information. The antenna element failure information may include, for example, status information for each antenna element, a failure event type, failure event occurrence time, MIMO antenna type (HW model name), and antenna parameter configuration information (electrical tilt, horizontal/vertical beam width, power boosting on/off). Further, when the base station is an LTE system, the antenna element failure information may further include information on the number of common reference signals (CRS) in operation.

Thereafter, in operation 810, the controller 211 may analyze a beamforming pattern according to each situation that has occurred previously or currently occurring based on the learned result, and derive an optimization model for the corresponding situations. In this case, when deriving the optimization model, the controller 211 may derive an optimization model in consideration of whether there is a gain, as described above with reference to FIGS. 5 to 7. Because the determination of existence of the gain has already been described with reference to the above drawings, a further description thereof will be omitted.

The controller 211 that has derived the optimization model may configure a new policy based on the derived optimization model and update the configured new policy in operation 820. In this case, after the configuration of the new policy, if a report to the operator is required, the controller 211 may perform only the determination of a new policy and store information on the gain in the database 240, and when approved by the operator, the controller 211 may be implemented to update the new policy. Further, when a new beamforming pattern is determined based on a new policy, the determined beamforming pattern may be self-healing beamforming information.

According to the operation of FIG. 8 described above, the controller 211 may perform machine learning using overall operation histories such as the history of actions in case of hardware breakdown (failure or error) of each base station, the history of changing a beamforming pattern for optimizing always operating coverage, and the history of applying an inappropriate beamforming pattern due to analysis error, and adaptively operate in various network operating environments by gradually updating it to an automatic optimization model.

Therefore, such history information should be stored in the database 240, as described above, machine learning may be performed using stored history data, and by analyzing the beamforming pattern and generating an optimization model, a policy may be updated periodically automatically or based on the operator's permission.

Figure 9:
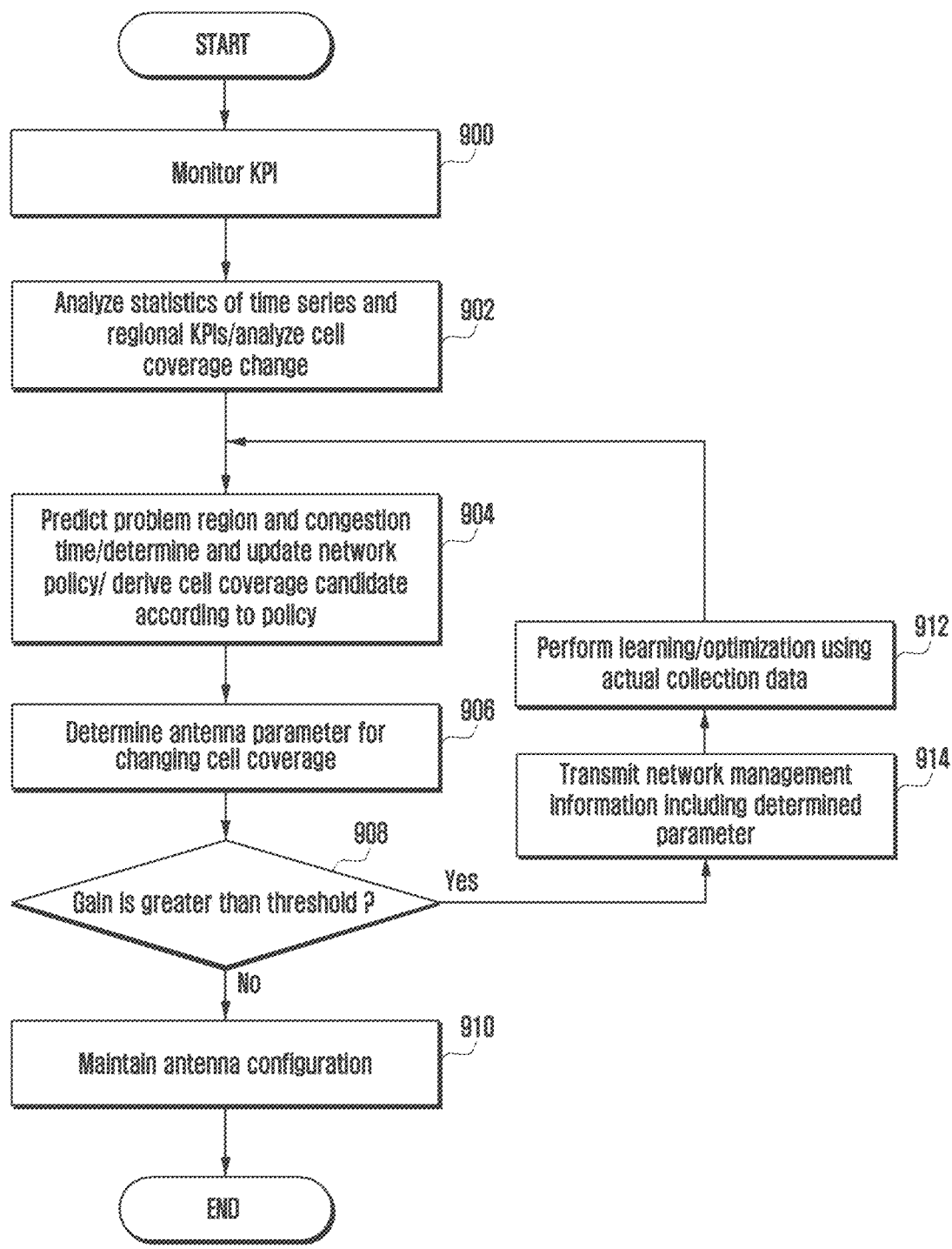
FIG. 9 is a control flowchart for predicting occurrence of a problem during network operation, analyzing an appropriate beamforming pattern according to a situation, and applying the same according to another embodiment of the disclosure.

FIG. 9 is a control flowchart for predicting occurrence of a problem during network operation, analyzing an appropriate beamforming pattern according to a situation, and applying the same according to another embodiment of the disclosure.

The control flow of FIG. 9 may be made in the analysis server 200 or the master server 40, as described above. Hereinafter, for convenience of description, it is assumed that the control is performed in the analysis server 200. Further, the analysis server 200 may include an artificial intelligence processer 220, as described above or may not include an artificial intelligence processer 220. The control flow of FIG. 9 may be performed by the artificial intelligence processer 220 or may be performed by the controller 211. In the following description, it is assumed that the operation is performed by the controller 211 and will be described.

The controller 211 may monitor a key performance indicator (KPI) of the base station in operation 900. As described above, the KPI of the base station may be examined based on base station performance information included in network management information, as described above.

Thereafter, the controller 211 may analyze statistics of time series and regional key performance indicators (KPIs) in operation 902. Here, the time series may mean analyzing statistics on KPIs for each month, week, weekday, weekend, day of the week, and time period. When analyzing such a time series index, it may be to analyze statistics for each time period, such as the monthly floating population (the number of user equipments), the number of camping user equipments, and the amount of traffic. Further, the regional KPI may be information on regional characteristics such as geographic requirements, for example, an urban area, a plain area, and a mountainous area.

Based on this information, the controller 211 may predict a congestion time and a region in which future problems may occur at a current time point in operation 904. For example, if a first base station is a base station near a subway station in an urban area, it is a weekday, and a current time is 6 AM, an expected congestion time may be from 7 AM to 9 AM. Further, 5 to 8 PM may be an expected congestion time for the same base station. As another example, when a second base station is at the beginning of a hiking trail in a mountainous area, there may be no congestion time on weekdays, and a specific time zone on weekends may be an expected congestion time. Such an expected congestion time may be predicted in advance through time series analysis and regional analysis.

As described above, the controller 211 may predict a congestion time in advance and determine a network policy based on the predicted result. For example, in the case of a first base station in the above assumption, because it is expected that many user equipments will appear around subway stations in a congestion time zone, a policy may be determined to configure a beamforming pattern in an appropriate form. Upon determining such a policy, the controller 211 may generate at least one antenna beamforming pattern correction information for changing cell coverage based on the policy determination. The antenna beamforming pattern correction information may include beamforming pattern correction parameters. That is, the controller 211 may derive at least one candidate for changing cell coverage based on the policy.

Thereafter, the controller 211 may determine an antenna parameter for changing cell coverage in operation 906. The antenna parameters may be beamforming pattern correction parameters to be applied to each antenna element of the antenna module, and the beamforming pattern correction parameters may include not only beamforming pattern information but also tilt and transmission power information. Further, in this case, the controller 211 may generate two or more beamforming patterns. In this case, the controller 211 may determine a beamforming pattern having a greatest gain among two or more beamforming patterns as a final beamforming pattern.

After determining the antenna parameter, that is, the beamforming pattern correction parameter in operation 906, the controller 211 may identify whether the gain is greater than or equal to a preconfigured threshold in operation 908. Here, the threshold may be a threshold based on whether throughput of a specific congested region may be increased. As a result of the inspection in operation 908, if the gain is greater than or equal to a preconfigured threshold, the controller 211 may proceed to operation 910, and if the gain is smaller than the preconfigured threshold, the controller 211 may proceed to operation 914 and determine to maintain the antenna configuration as it is.

When proceeding to operation 910, the controller 211 may generate management control information to change the antenna configuration with the determined parameter and transmit the generated management control information to the corresponding base station through the EMS. Thereby, the base station may change the beamforming pattern based on the management control information provided from the analysis server 200 in a specific time zone. In this case, the controller 211 may instruct to report base station performance information at a predetermined time, for example, every 5 minutes or 10 minutes based on the changed beamforming pattern correction parameter in the network management information transmitted in operation 910. Here, 5 minutes or 10 minutes are a time configured for convenience of understanding, and may be configured to different time values based on an amount of data transmitted to the management network, a load level of the base station, and impact evaluation information according to the change in the beamforming pattern of the base station. For example, a serious level of communication failure may actually occur due to a change in a beamforming pattern. In particular, the frequency of occurrence of radio link failure (RLF) may increase rapidly from a terminal during communication or sudden deterioration of a communication quality may occur. In this case, a time value should be configured to report in very short time units, for example, several seconds. However, when the above specific situation does not occur, a relatively sufficient time value, for example, several minutes to several tens of minutes may be configured. Further, the beamforming pattern correction parameter of the network management information determined in operation 910 may be self-healing beamforming information.

Further, the controller 211 may receive base station performance information received from the corresponding base station based on the changed antenna configuration information in step 912. Based on such base station performance information, the controller 211 may apply a proactive problem analysis model, modify the optimization model, or update a current model to an optimization model.

Thereafter, the controller 211 may perform operation 904 again. The reason for performing operation 904 again after performing operation 912 is that it may be necessary to recover an original model again or to recover an original model to a newly updated model because it is the control based on the prediction of a specific situation. This is because additional correction may be required based on network management information received from base stations after predictive control. Therefore, it was configured to perform operation 904 after operation 912.

The operation of FIG. 9 described above may be performed in a preconfigured time period. Thereby, the situation of the base stations may be predicted periodically, and control may be performed based on the result.

According to FIG. 9 described above, by pre-analyzing and predicting a pattern of occurrence of a problem with respect to a cell that may cause a problem, and determining beamforming pattern correction information in advance based on the analyzed result, the network may be more efficiently managed.

However, the operations of FIGS. 5 to 9 described above may be operated individually, or the analysis server may be provided so that two or more operations are performed together. For example, the operations of FIGS. 5 and 6 may be performed together as in FIG. 7. Further, the operation of FIG. 8 may enable the management server to configure and update a policy through a separate process.

Further, the operation of FIG. 9 may be implemented together with or in parallel with the operation of FIG. 7 or through a separate process.

Figure 10:
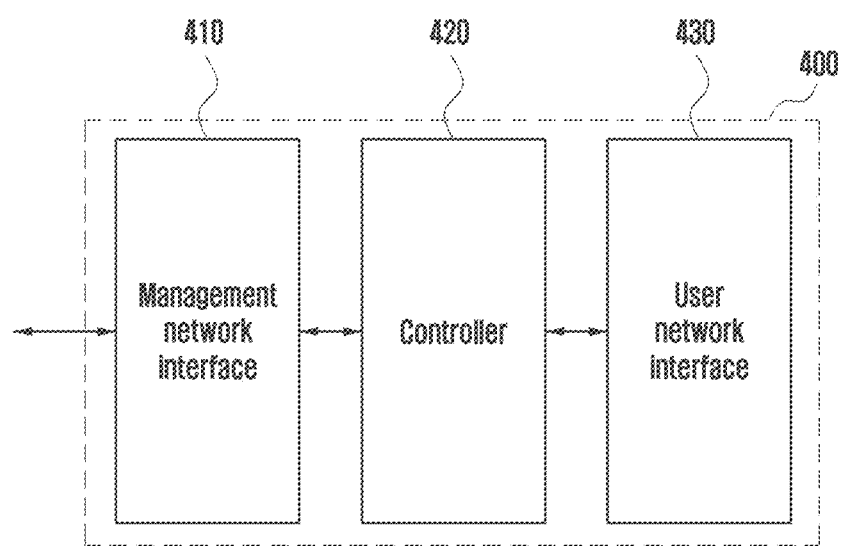
FIG. 10 is a block diagram illustrating a constitution of a server according to various embodiments of the disclosure.

FIG. 10 is a block diagram illustrating a configuration of a server according to various embodiments of the disclosure.

The server of FIG. 10 may be the server 400 described above with reference to FIG. 1. Therefore, the server 400 may include a master server 40 and a web application server 50 therein. In the disclosure, as illustrated in FIG. 1, the server 400 may be implemented into separate servers, and the master server 40 and the web application server 50 may be implemented into one integrated server. In FIG. 10, a description will be made on the assumption that the server is an integrated server.

With reference to FIG. 10, the server 400 may include a management network interface 410, a controller 420, and a user network interface 430. The management network interface 410 may be connected to the analysis servers 200a, 200b, . . . , 200c to provide an interface for data transmission and reception.

The controller 420 may be implemented with at least one processor, and perform overall operations of the server 400. If the controller 420 is implemented with a plurality of processors, logic for communication between the respective processors may be required.

Further, the operation of the controller 420 may include a control operation for providing policy information performed by the master server 40 to the respective analysis servers 200a, 200b, . . . , 200c. Further, the operation of the controller 420 may control a request from the web client 60 or acquisition of necessary information through the analysis servers 200a, 200b, . . . , 200c and/or the data center 30 for management of network information. The controller 420 may control to store the obtained information in a database (not illustrated in FIG. 10) positioned inside or outside the server 400. Further, when network management information is requested from the web client 60, that is, a specific device of the operator, the controller 420 may control to process network management information so as to provide network management information to a graphic interface, and to provide the network management information to the web client 60 through the user network interface 430.

When implemented with the master server 40 and the web application server 50, the user network interface 430 may be a configuration included in the web application server 50. The user network interface 430 may output a request signal provided from the web client 60 to the controller 420 and perform interfacing to provide data provided from the controller 420 to the web client 60.

Figure 11:
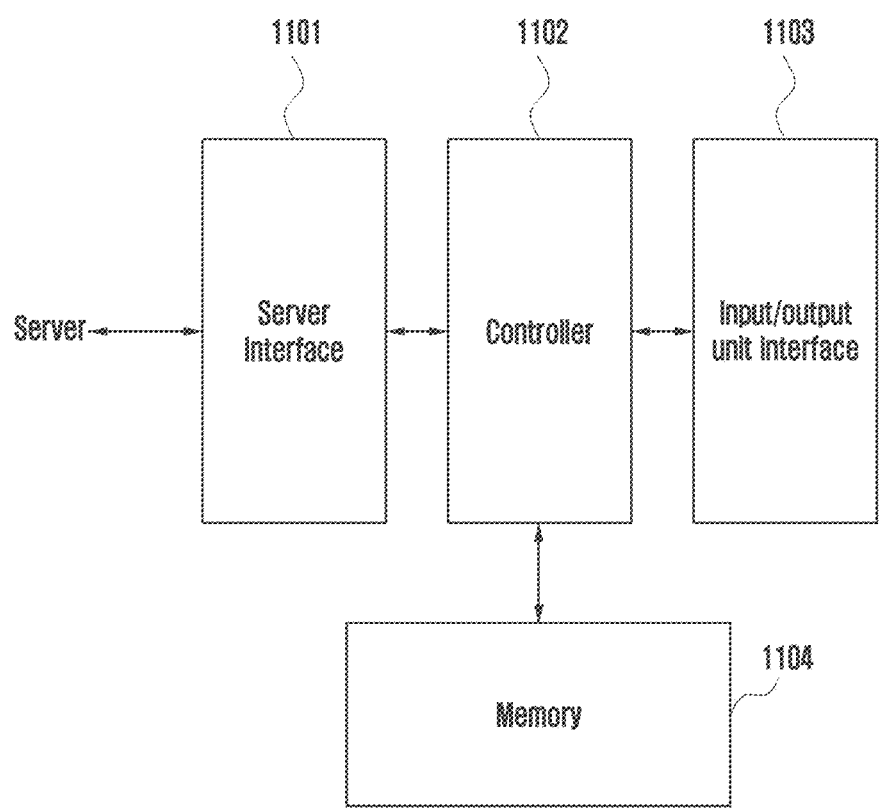
FIG. 11 is a functional block diagram illustrating a constitution of a web client device according to an embodiment of the disclosure.

FIG. 11 is a functional block diagram illustrating a configuration of a web client device according to an embodiment of the disclosure.

With reference to FIG. 11, the web client device 60 may include a server interface 1101, a controller 1102, an input/output unit 1103, and a memory 1104.

The server interface 1101 may perform interface of data transmitted and received by accessing the server 400 or the web application server 50 constituting a management network through a private network or a general data network.

The controller 1102 may be implemented into at least one processor, and perform overall control of the web client device 60. In particular, according to the disclosure, the controller 1102 may generate various control signals based on an operator's input and thus provide various control signals to the server 400. A detailed operation thereof will be described with reference to the drawings to be described later.

The input/output unit 1103 may include various input devices for inputting signals of a user, that is, an operator, and various types of output devices for providing information to an operator. For example, the input device may include devices for a user to input into a general computer, such as a keyboard, a mouse, a scanner, and a stylus pen. Further, the output device may be any type capable of providing information to the user, such as a monitor, a speaker, a printer, a beam projector, and a hologram output device.

The memory 1104 may be implemented in a form such as a ROM, RAM, hard disk, and compact disc read-only memory (CD-ROM) and may include an area capable of storing various types of data required in the web client 60 and a general data storage area according to the disclosure.

The web client 60 described above may be implemented in the same form as that of a personal computer (PC), and be implemented in the form of a laptop computer, notebook computer, personal digital assistant (PDA), smart phone, or the like.

Hereinafter, according to the disclosure, a form of controlling each base station in the analysis servers and interfaces for providing the history from the web client 60 to the operator will be described.

FIGS. 12A to 12I are exemplary diagrams of a graphical interface for providing control results and current states of base stations to an operator according to various embodiments of the disclosure.

Figure 12A:
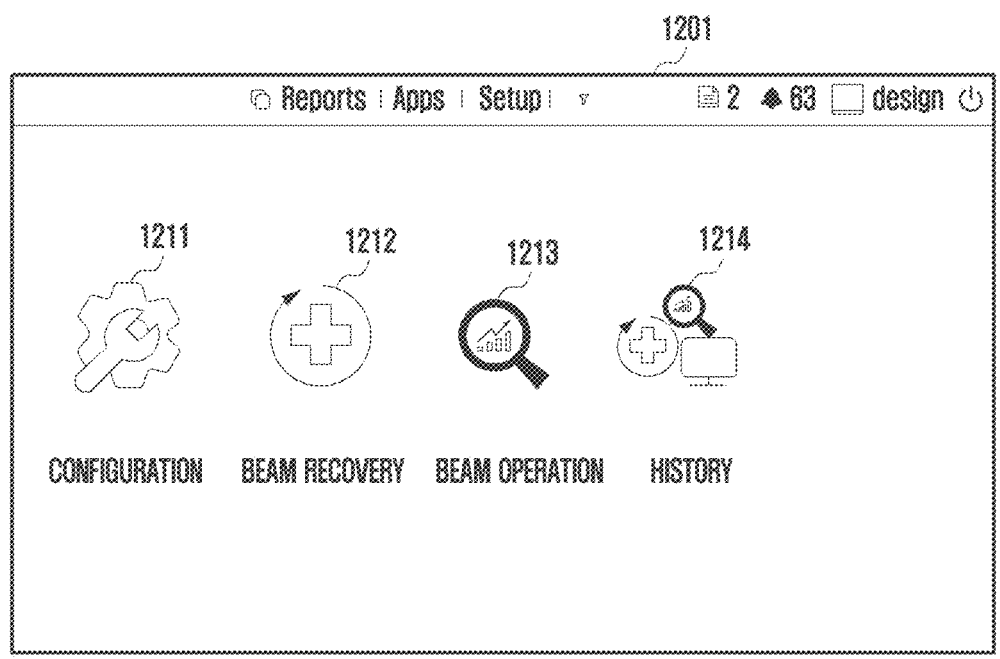

First, with reference to FIG. 12A, a specific program of an operator interface, for example, an application programmed to collect information according to the disclosure may be driven in the web client 60. In this case, it is assumed that the server 400 is accessed through a configuration of user information and password for identifying the operator.

When accessing the server 400 in this way, the web client 60 may receive information on an initial screen from the web application server 50 or the server 400. FIG. 12A is a diagram illustrating a display form of initial data on a screen 1201.

In the embodiment of the disclosure, four specific execution icons are exemplified on an initial screen. The four specific execution icons may include a configuration icon 1211 that may configure or change an application configuration, a beam recovery icon 1212 for searching for beam recovery, a beam optimization icon 1213 for beam optimization, and a history information icon 1214 for providing history information. When more information should be provided, as needed, additional icons may be further disposed.

First, a case in which the operator selects the beam recovery icon 1212 through the input/output unit 1103 of the web client 60 will be described with reference to FIG. 12B.

Figure 12B:
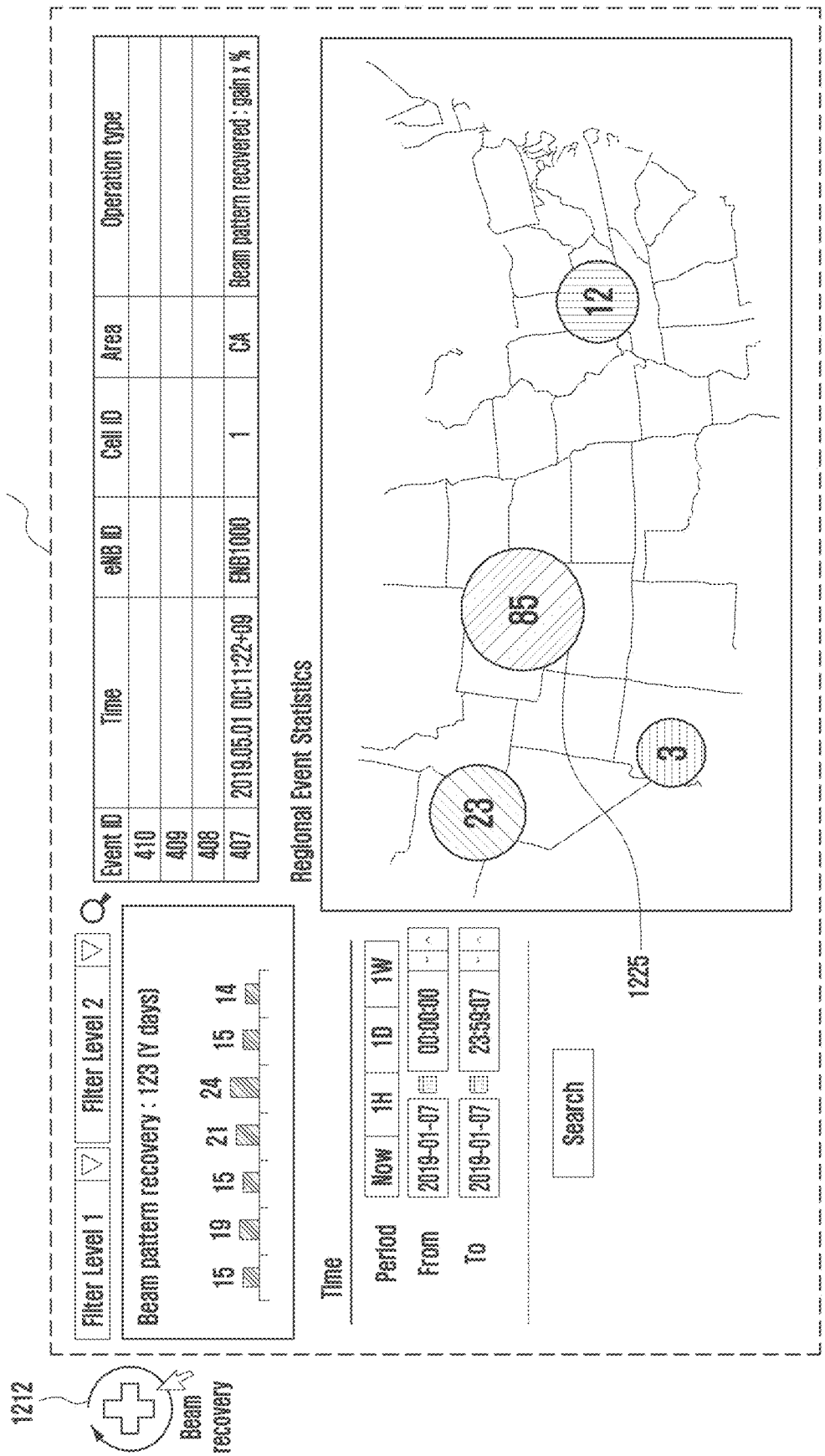

With reference to FIG. 12B, reference numeral 1212 is a form added to describe that the beam recovery icon 1212 was selected. Accordingly, on the screen 1201, filter levels may be a period search window that may input a search period. At the bottom of the period search window, information on the number of times of beamforming pattern recovery within a configured period may be exemplified in the form of the number of times per day.

Further, the time configuration window may specify a time configuration method and may include additional icons that may be selected briefly, such as now, 1 hour (1 H), 1 day (1 D), and 1 week (1 W). At the bottom of the time configuration window, a search condition filter capable of inputting date and time information desired to start (from) the search and a search condition filter capable of inputting information on a date and time desired to end (to) the search may be included. After the condition is configured, the search may be made by selecting a search button.

Such a condition may be an input of the above-described input/output unit 1103, and the controller 1102 may generate a query signal corresponding to the input condition, and provide the query signal to the server 400 through the server interface 1101. Therefore, if the server 400 has its own database, the server 400 may read information from the database stored therein, and if the server 400 does not have its own database, the server 400 may request information of a corresponding condition to a database of the respective analysis servers 200a, 200b, ..., 200c. As another example, the data center 30 stores information stored in the database of each of the analysis servers 200a, 200b, ..., 200c, and the server 400 may request and receive the corresponding information from the data center 30. Accordingly, the server 400 may process the received information into a form recognizable by the web client 60 and provide the information to the web client 60.

Therefore, the web client 60 may receive a result value according to the search condition and provide a result value in the form described with reference to FIG. 12B or other drawings.

With reference to FIG. 12B, in a history window illustrating an operation history of the analysis server, the generated event identifier, a base station identifier corresponding to time information, cell identifier, area information, and an operation type may be provided in a table format. In this case, they may be exemplified in a format other than the table format.

Further, information on the corresponding condition may be displayed through a regional event statistics window. The regional event statistics window may display together the map and a location of the base station and the number of events generated in the base station on the map. Reference numeral 1225 denotes a base station in which the number of times that an event occurs within the regional event statistics window is 85 times.

Each of the above windows may display individually only one window, but in the disclosure, for convenience of description, two or more windows are simultaneously displayed in one screen 1201.

When the operator changes conditions of the windows, selects a specific base station, or changes conditions of the search window using an input device such as a keyboard or a mouse, the information illustrated in FIG. 12B may be updated again.

Figure 12C:
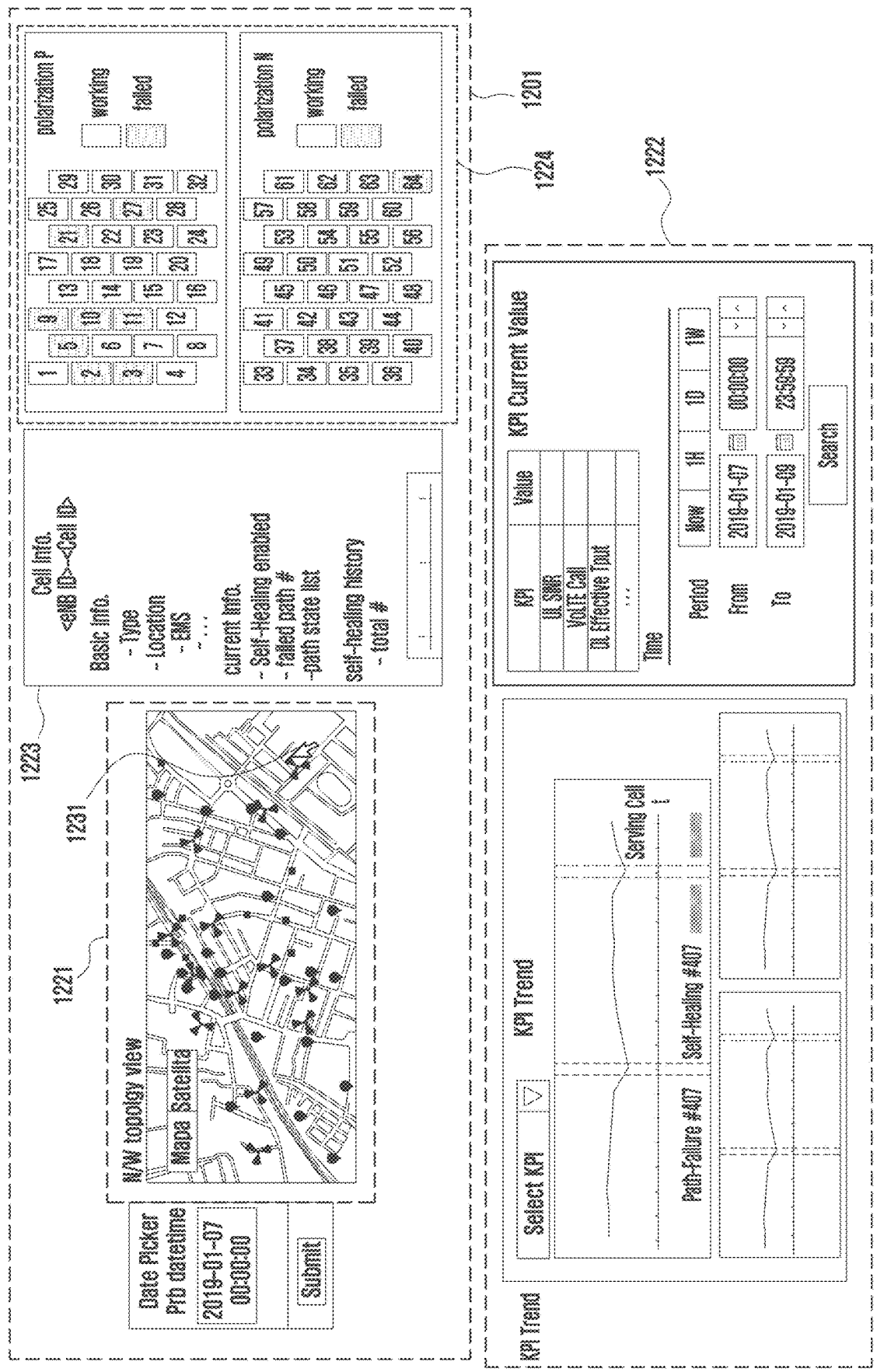

Next, FIG. 12C illustrates a state in which various windows are displayed in the screen 1201.

In FIG. 12C, an N/W topology view window 1221 may have a form for visually providing a network form to the operator. Therefore, each base station and a beamforming pattern of the base station are exemplified together. When a specific base station 1231 is selected within the N/W topology view window 1221, windows displaying two pieces of information may be generated, as illustrated by an arrow. Further, the windows illustrated in FIG. 12C are not displayed together with the N/W topology view window 1221, but after selection, each window may be sequentially displayed on the next screen.

First, a cell view window for a selected base station 1231 in the N/W topology view window 1221 may provide base station information, for example, a base station identifier, a cell identifier, basic information, current information, self-healing history information and the like, as illustrated in FIG. 12C to the operator.

Next, in a KPI trend window for the selected base station 1231 in the N/W topology view window 1221, a window for providing a trend for a predetermined time and a KPI current value may be displayed.

The KPI trend window may provide a time series change visualization function by selecting a performance indicator of interest for each cell. Further, the KPI trend window may be visually provided to the operator by marking the time of occurrence of a specific event, such as a breakdown, and overlay-plotting it with a time series change graph. The KPI trend window may plot together a time-series graph of performance indicators of a cell of interest (e.g., a cell in which a failure has occurred) selected by the user, that is, the operator and adjacent cells. Further, the KPI trend window may plot together a plurality of performance indicator time series graphs for the cell of interest selected by a user.

Finally, an antenna window 1224 is illustrated in FIG. 12C. The antenna window 1224 of FIG. 12C assumes an LTE system and a case in which two CRSs are transmitted. The antenna window is an antenna window exemplifying an antenna element operating with respect to a P pole and an antenna element in a failure or error (breakdown) state, and an antenna element operating with respect to an N pole and an antenna element in a failure or error (breakdown) state in the antenna window of the desired cell. More specifically, the antenna window 1224 of FIG. 12C may be a case for generating a first CRS beam using a P pole in the same MIMO antenna at the same time when operating two CRSs in an LTE system, and generating a second CRS beam using an N pole. The first CRS beam and the second CRS beam generated in this way may be broadcast by applying a beamforming pattern configured through respective poles.

The numbers assigned to each antenna element may be a preconfigured number for identifying the antenna elements.

Figure 12D:
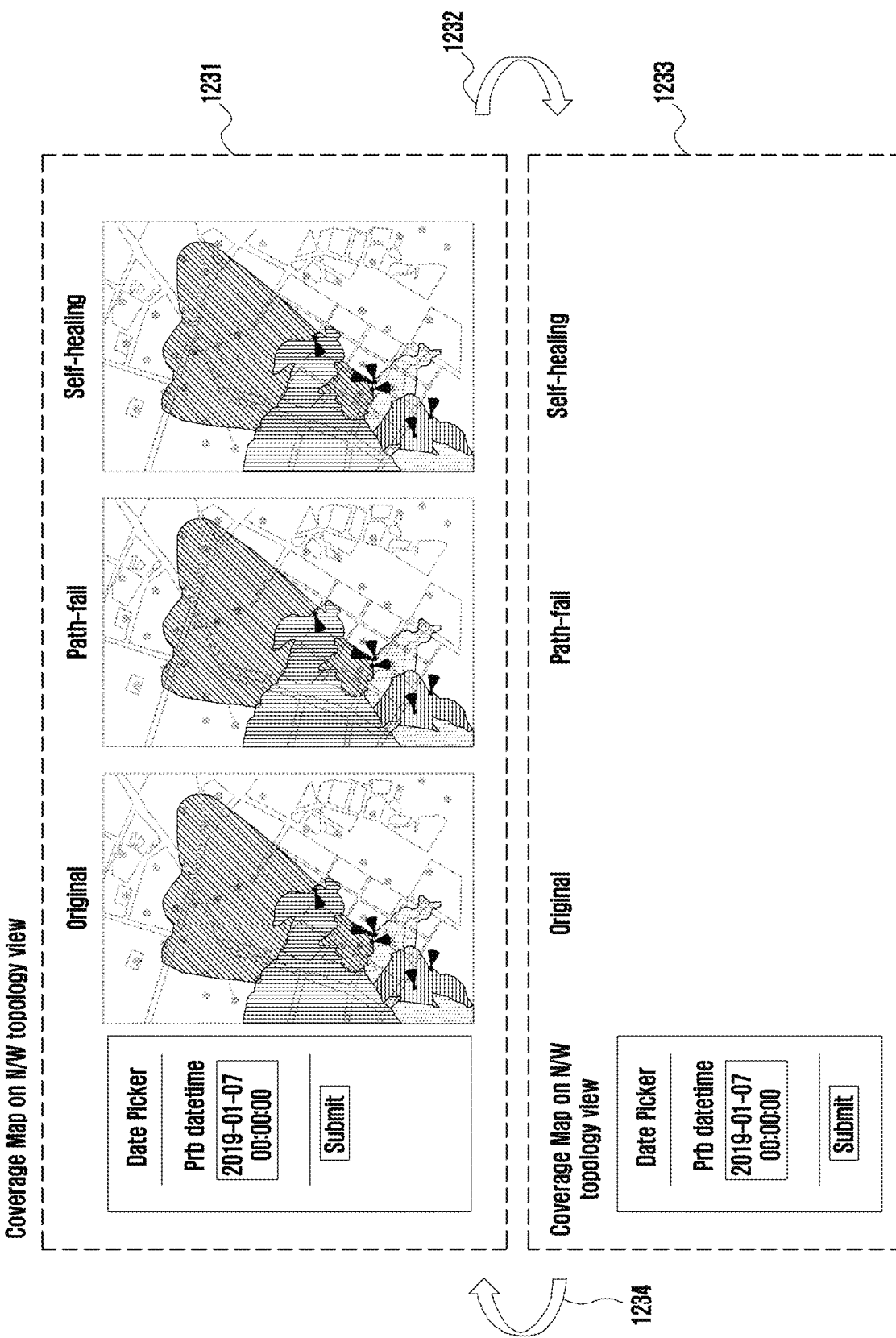

With reference to FIG. 12D, there may be windows illustrating a coverage map by a base station on a network topology view. First, only a coverage map window 1231 may be displayed on the screen 1201. In this case, the coverage map window 1231 may include an original view window in a normal state, a path-fail view window, and a view window self-healed based on a beamforming pattern correction parameter. When the operator requests window modification, as illustrated in reference numeral 1232, the screen 1201 may be switched to an RF quality heatmap on N/W topology view window 1233 on the network topology view. Again, on the network topology view, the RF quality heatmap on N/W topology view window 1233 may be switched to the coverage map window 1231, as indicated by reference numeral 1234 according to an operator's request.

Further, in some cases, the two windows 1232 and 1233 may be implemented to be displayed together on the screen 1201. Further, in the coverage map window 1231, an original view window in a normal state, a path-fail view window, and a view window self-healed based on the beamforming pattern correction parameter may be sequentially displayed or may be displayed in an overlapping manner. This is equally applicable to the RF quality heat map window 1233 on the network topology view.

Figure 12E:
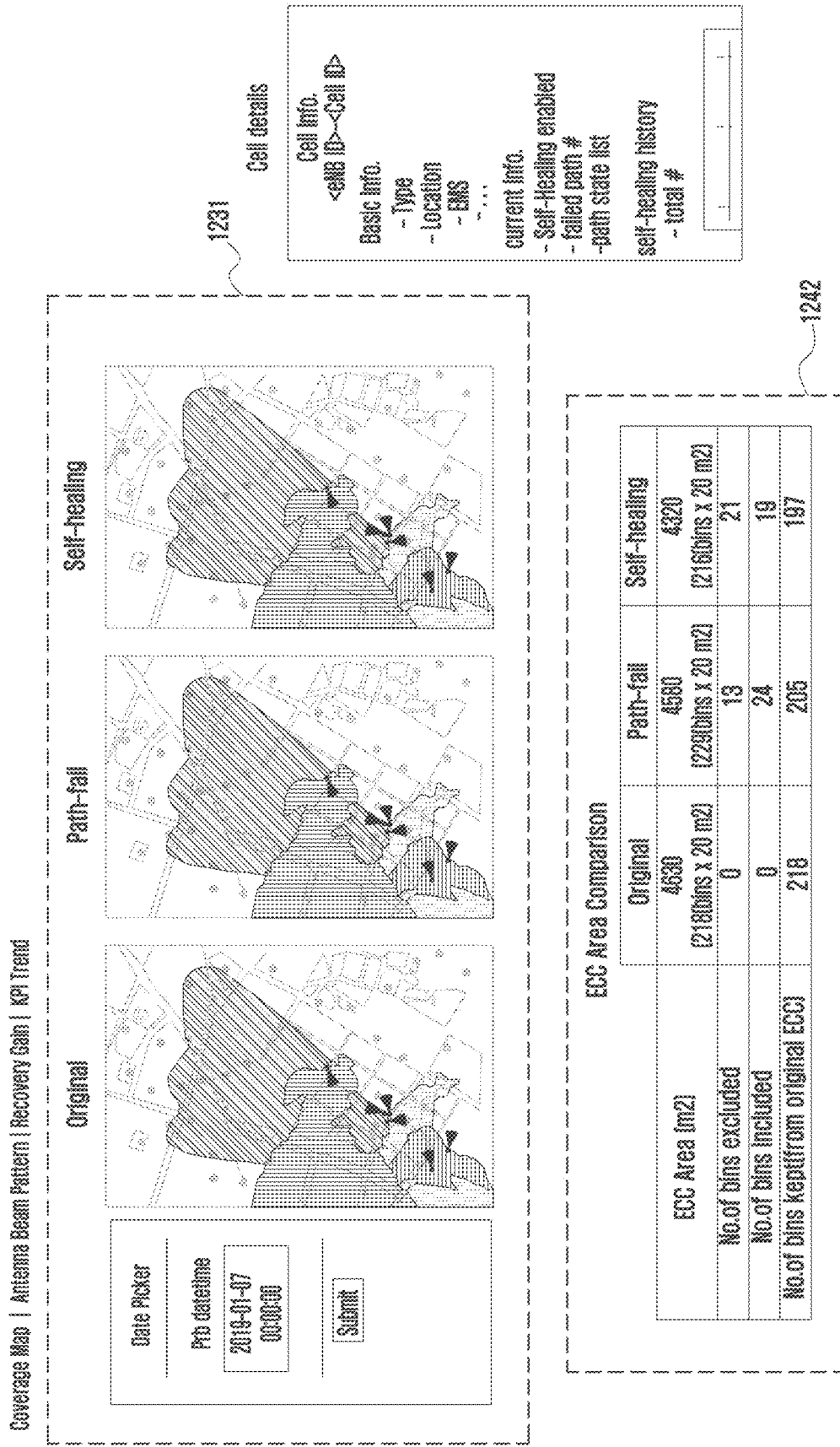

FIG. 12E is an exemplary diagram of a configuration of a screen 1201 of a case in which an estimated cell coverage (ECC) area comparison table 1242 and cell information of the corresponding base station are provided when a specific base station is selected in the coverage map window 1231. Because cell coverage may be changed according to the change in the beamforming pattern, the ECC may be information for visually providing to the operator through an estimated value of the change in cell coverage according to the change in the beamforming pattern.

The coverage map window 1231 illustrated in FIG. 12E may be a state marked on the map by predicting the change in the cell coverage when a beamforming pattern of the user's cell of interest and adjacent cells is changed (recovery/optimization, breakdown occurrence and the like). Further, the ECC area comparison table may be a table numerically illustrating the area change and the degree of new inclusion/exclusion by predicting the cell coverage change when a beamforming pattern of the user's cell of interest and adjacent cells is changed (recovery/optimization, failure and the like).

Figure 12F:
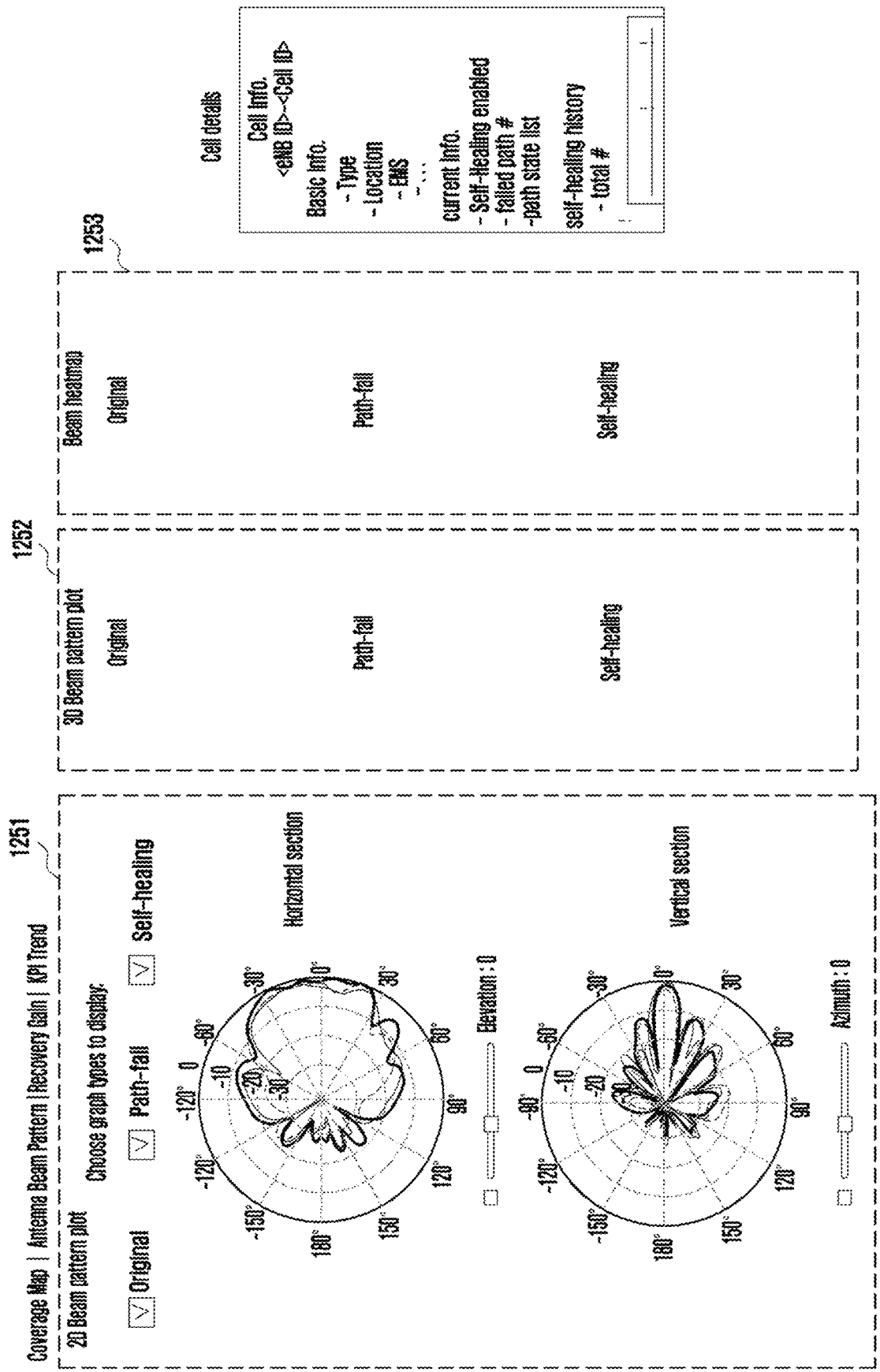

FIG. 12F is windows visually illustrating an antenna beamforming pattern according to various embodiments of the disclosure. Each of the windows may include an original beamforming pattern window, a path loss beamforming pattern window, and a self-healing window, as described above.

First, the windows may include a 3D beamforming pattern window 1252 and a beam heat map window 1253, and in addition, a 2D beamforming pattern pilot window 1251 may be displayed.

FIG. 12G is a table illustrating a recovery gain, and may be a table for displaying recovered information with respect to a specific cell to an operator. Data displayed in FIG. 12G exemplifies together information according to an original beamforming pattern, information difference in the case of having a path loss, and results.

Figure 12H:
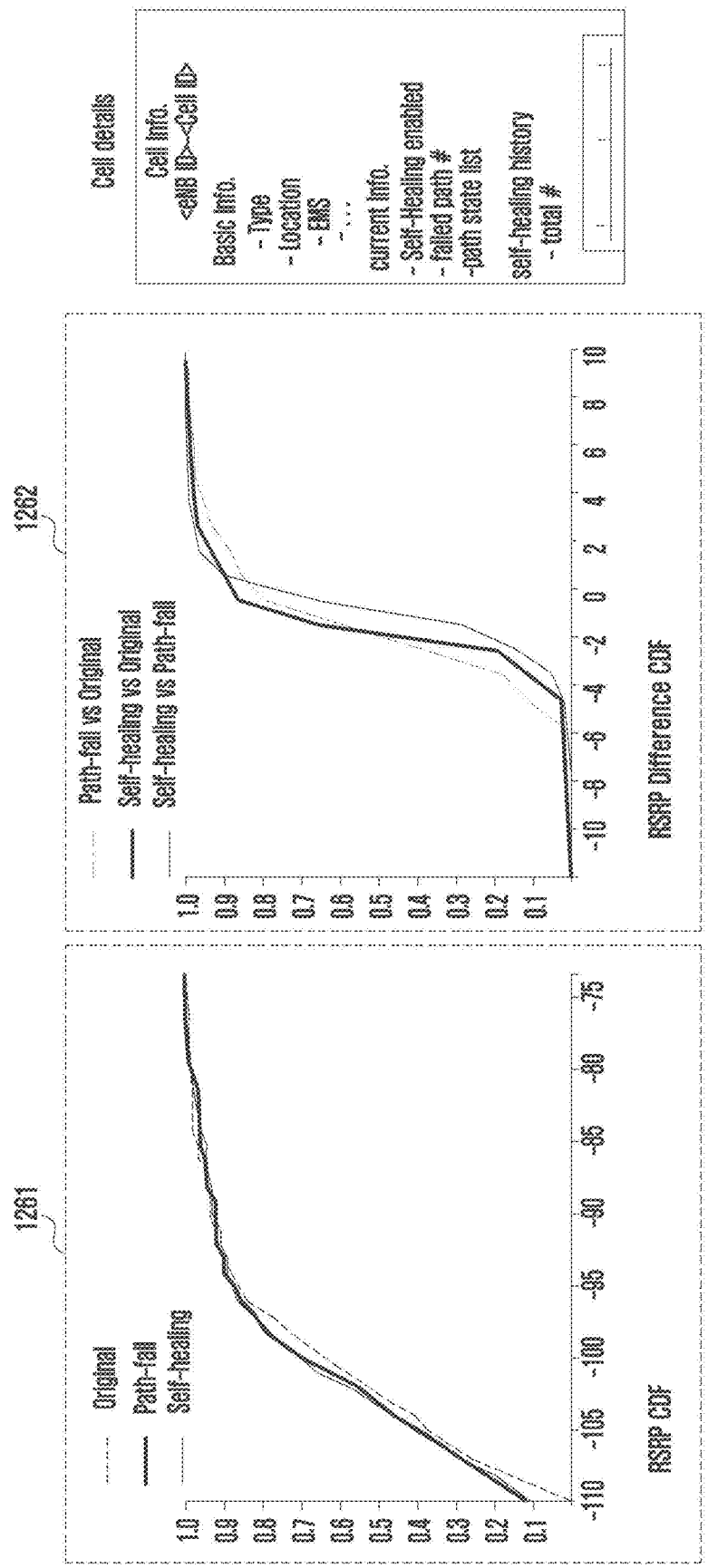

FIG. 12H is windows 1261 and 1262 illustrating a change in a beamforming pattern for a specific cell when a specific cell is selected. For example, the change in the beamforming pattern illustrates a graph for the RSRP difference and a cumulative density function (CDF) of a received signal received power (RSRP) predicted value of a received signal before and after a breakdown and when recovery is performed accordingly.

Figure 12I:
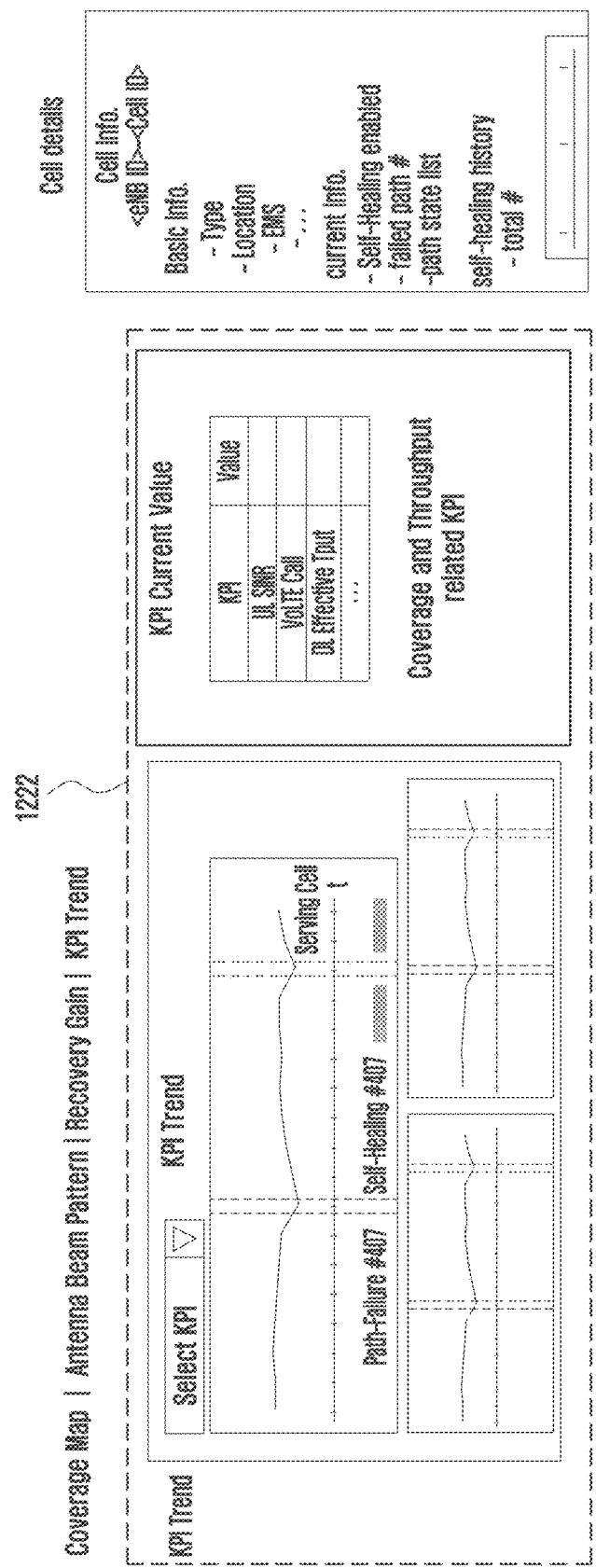

FIG. 12I is a diagram illustrating the KPI trend window 1222 in more detail. Such trend information may provide an event ID to detailed details of an event that has occurred, as described above, and provide a time of occurrence, an occurrence cell, a location of the cell, event details, an action history and the like to the operator.

Further, embodiments of the disclosure disclosed in this specification and drawings merely present specific examples in order to easily describe the contents of the disclosure and help the understanding of the disclosure, and they are not intended to limit the scope of the disclosure. Therefore, all changes or modifications derived based on the technical spirit of the disclosure in addition to the embodiments disclosed herein should be construed as being included in the scope of the disclosure.

The disclosure is applicable to a network for managing a base station of a wireless communication system.

The invention claimed is:

1. A method performed by an analysis server in a base station management network, the method comprising:
receiving network management information including identifier information of an entity management system (EMS), wherein the EMS is associated with a base station and the analysis server; and
in case that the network management information indicates an antenna element failure occurrence of a base station:
analyzing a beamforming pattern impact and cell coverage change of the base station;
determining a first beamforming pattern correction parameter for compensating for the antenna element failure occurrence based on a result of the analyzing the beam forming pattern impact and the cell coverage change; and
transmitting, to the base station, management control information including information on the first beamforming pattern correction parameter,
wherein the first beamforming pattern correction parameter is for remaining antenna elements, except for at least one antenna element in which a failure has occurred in the base station.

2. The method of claim 1, wherein determining the first beamforming pattern correction parameter further comprises:
generating two or more beamforming pattern correction parameters for compensation due to the antenna element failure occurrence; and
determining a beamforming pattern correction parameter with a greatest gain among the generated beamforming pattern correction parameters as the first beamforming pattern correction parameter.

3. The method of claim 1, wherein the network management information includes identifier information of the base station and antenna element failure information of the base station, and
wherein the network management information further includes at least one of performance information of the base station, or processing result information according to an emergency recovery program of the base station.

4. The method of claim 1, further comprising:
analyzing a user pattern of the base station and an impact of an adjacent cell in case that the network management information indicates cell performance degradation of the base station;
determining a second beamforming pattern correction parameter based on a result of analyzing the user pattern and the impact; and
transmitting, to the base station, management control information including the second beamforming pattern correction parameter.

5. The method of claim 4, wherein the user pattern is pattern information generated based on information on an amount or a ratio of voice calls, 1:1 data communication, and broadcast data communication for all user equipment positioned included in cell coverage of the base station.

6. The method of claim 4, wherein the analysis of the impact the adjacent cell comprises analysis of a beam impact from the base station and a user equipment in cell coverage of the base station.

7. The method of claim 1, wherein the management control information is transmitted to the base station in case that a gain to be obtained based on the first beamforming pattern correction parameter is greater than or equal to a threshold, and
wherein the method further comprises transmitting, to a master server controlling the base station management network, information on antenna element replacement alarm in case that the gain is smaller than the threshold.

8. An analysis server in a base station management network, the analysis server comprising:
an input unit;
an output unit; and
a controller coupled with the input unit and the output unit, wherein the controller is configured to:
receive network management information including identifier information of an entity management system (EMS), wherein the EMS is associated with a base station and the analysis server; and
in case that the network management information indicates an antenna element failure occurrence of a base station:
analyze a beamforming pattern impact and cell coverage change of the base station;
determine a first beamforming pattern correction parameter for compensating for the antenna element failure occurrence based on a result of analyzing the beamforming pattern impact and the cell coverage change; and
transmit, to the base station, management control information including information on the first beamforming pattern correction parameter,
wherein the first beamforming pattern correction parameter is for remaining antenna elements, except for at least one antenna element in which a failure has occurred in the base station.

9. The analysis server of claim 8, wherein the controller is further configured to:
generate two or more beamforming pattern correction parameters for compensation due to the antenna element failure occurrence; and
determine a beamforming pattern correction parameter with a greatest gain among the generated beamforming pattern correction parameters as the first beamforming pattern correction parameter.

10. The analysis server of claim 8, wherein the network management information includes identifier information of the base station and antenna element failure information of the base station, and
wherein the network management information further includes at least one of performance information of the base station, or processing result information according to an emergency recovery program of the base station.

11. The analysis server of claim 8, wherein the controller is further configured to:
analyze a user pattern of the base station and an impact of an adjacent cell in case that the network management information indicates cell performance degradation of the base station;
determine a second beamforming pattern correction parameter based on a result of analyzing the user pattern and the impact; and
transmit, to the base station, management control information including the second beamforming pattern correction parameter.

12. The analysis server of claim 11, wherein the user pattern is pattern information generated based on information on an amount or a ratio of voice calls, 1:1 data communication, and broadcast data communication for all user equipment positioned included in cell coverage of the base station.

13. The analysis server of claim 11, wherein the analysis of the impact of the adjacent cell comprises analysis of a beam impact from the base station and a user equipment in cell coverage of the base station.

14. The analysis server of claim 8, wherein the management control information is transmitted to the base station in case that a gain to be obtained based on the first beamforming pattern correction parameter is greater than or equal to a threshold, and
wherein the controller is further configured to transmit, to a master server controlling the base station management network, information on antenna element replacement alarm in case that the gain is smaller than the threshold.

* * * * *